(12) United States Patent
Dasari et al.

(10) Patent No.: US 11,802,045 B1
(45) Date of Patent: Oct. 31, 2023

(54) HYDRIDED MODERATORS FOR NUCLEAR REACTORS

(71) Applicant: Triad National Security, LLC, Los Alamos, NM (US)

(72) Inventors: Venkateswara Rao Dasari, Los Alamos, NM (US); Erik Luther, Los Alamos, NM (US); Dustin Cummins, Los Alamos, NM (US); Tarik Saleh, Los Alamos, NM (US); Joshua Taylor White, Los Alamos, NM (US); Joseph Wermer, Los Alamos, NM (US); Aditya Shivprasad, Los Alamos, NM (US); A.J. Fallgren, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 370 days.

(21) Appl. No.: 16/887,863

(22) Filed: May 29, 2020

Related U.S. Application Data

(60) Provisional application No. 62/892,179, filed on Aug. 27, 2019, provisional application No. 62/853,741, filed on May 29, 2019.

(51) Int. Cl.
  *C01B 6/02* (2006.01)
(52) U.S. Cl.
  CPC ........................... *C01B 6/02* (2013.01)
(58) Field of Classification Search
  CPC . G21C 5/12; G21C 15/08; G21C 3/07; G21C 3/326; G21C 3/048; G21C 3/28;
  (Continued)

(56) References Cited

U.S. PATENT DOCUMENTS

| 2,929,707 | A | * | 3/1960 | Weeks | .................... G21C 3/58 376/901 |
|---|---|---|---|---|---|
| 3,376,107 | A |   | 4/1968 | Akira | |

(Continued)

OTHER PUBLICATIONS

C. E. Lundin et al., "Pressure-Temperature-Composition Relationships of the Yttrium-Hydrogen System," Journal of the Electrochemical Society, vol. 109, No. 9, pp. 838-842 (Sep. 1962).

(Continued)

*Primary Examiner* — Steven J Bos
*Assistant Examiner* — Syed T Iqbal
(74) *Attorney, Agent, or Firm* — Alston & Bird LLP

(57) ABSTRACT

High temperature moderators for nuclear reactors and processes for their production are disclosed. The moderators include at least one hydrided metal and/or hydride metal allow, such as yttrium hydride, thorium hydride, yttrium-cerium hydride, yttrium-gadolinium hydride, yttrium calcium hydride, cerium hydride, etc. Such metal hydrides and/or hydride alloys may have high thermal stability, a relatively low thermal neutron absorption cross section, the ability to retain hydrogen over a large temperature range, and have good mechanical properties. Such moderators may induce spectral shift in reactors which, in turn, magnifies the Doppler reactivity temperature coefficient. Such moderators to thermalize neutrons may also enhance fuel utilization and cost-effectiveness of the reactor while keeping the core portable.

15 Claims, 27 Drawing Sheets

(58) Field of Classification Search
CPC .. G21C 3/30; G21D 5/02; Y02E 30/00; Y02E 30/30; C01B 6/02
See application file for complete search history.

(56) References Cited

U.S. PATENT DOCUMENTS

| | | | |
|---|---|---|---|
| 3,803,043 A * | 4/1974 | Magladry | C01B 33/04 |
| | | | 264/43 |
| 5,443,616 A | 8/1995 | Congdon | |
| 10,643,756 B2 | 5/2020 | McClure et al. | |

OTHER PUBLICATIONS

E. Zuzek, J. P. Abriata, A. San-Martin, and F. D. Manchester, "The H-13 Zr (hydrogenzirconium) system," Bull. Alloy Phase Diagr., vol. 11, No. 4, pp. 385-395, Aug. 1990.

F. D. Manchester and J. M. Pitre, "The Ce—H (Cerium-Hydrogen) system," J. Phase Equilibria, vol. 18, No. 1, p. 63, Feb. 1997.

F. H. Spedding (1960) The Rare-Earth Metals, Metallurgical Reviews,5:1,297-348, DOI: 10.1179/mtlr.1960.5.1.297.

G. E. Sturdy and R. N. R. Mulford, "The Gadolinium-Hydrogen Systeml," J Am. Chem. Soc., vol. 78, No. 6, pp. 1083-1087, Mar. 1956.

J. A. Ober, "Mineral commodity summaries 2019," Reston, VA, Report, 2019.

J. P. Blackledge, "Chapter 10—Yttrium and Scandium Hydrides," in Metal Hydrides, Academic Press, 1968, pp. 141-489.

K. Toguchi, M. Tada, and Y. C. Huang, "The effect of the absorption of hydrogen on allotropic transformations in the rare earth metals," J. Common Met., vol. 88, No. 2, pp. 469-478, Dec. 1982.

Kai Fu, Xiaojing Jiang, Yanru Guo, Shuan Li, Jie Zheng, Wenhuai Tian, and Xingguo Li, "Experimental investigation and thermodynamic assessment of the ytrium-hydrogen binary system," Progress in Natural Science: Materials International, vol. 28, Issue 3, pp. 332-336 (2018).

L. N. Yannopoulos et al., "The Thermodynamics of the Yttrium-Hydrogen System," The Journal of Physical Chemistry, vol. 69, No. 8, pp. 2510-2515 (Aug. 1965).

M. W. Mallett and I. E. Campbell, "The Dissociation Pressures of Thorium Dihydride in the Thorium-Thorium Dihydride System1a," J. Am. Chem. Soc., vol. 73, No. 10, pp. 4850-4852, Oct. 1951.

R. W. Curtis and P. Chiotti, "Thermodynamic Properties of Calcium Hydride1," J. Phys. Chem., vol. 67, No. 5, pp. 1061-1065, May 1963.

D. W. Wootan et al., "Analysis and Results of a Hydrogen-Moderated Isotope Production Assembly in the Fast Flux Test," Nuclear Science and Engineering, 103:150-156 (Oct. 1989). Daigo Setoyama et al., "Mechanical properties of yttrium hydride," Journal of Alloys and Compounds, 394:207-210, (2005).

Daigo Setoyama et al., "Mechanical properties of yttrium hydride," Journal of Alloys and Compounds, 394:207-210, (2005).

* cited by examiner

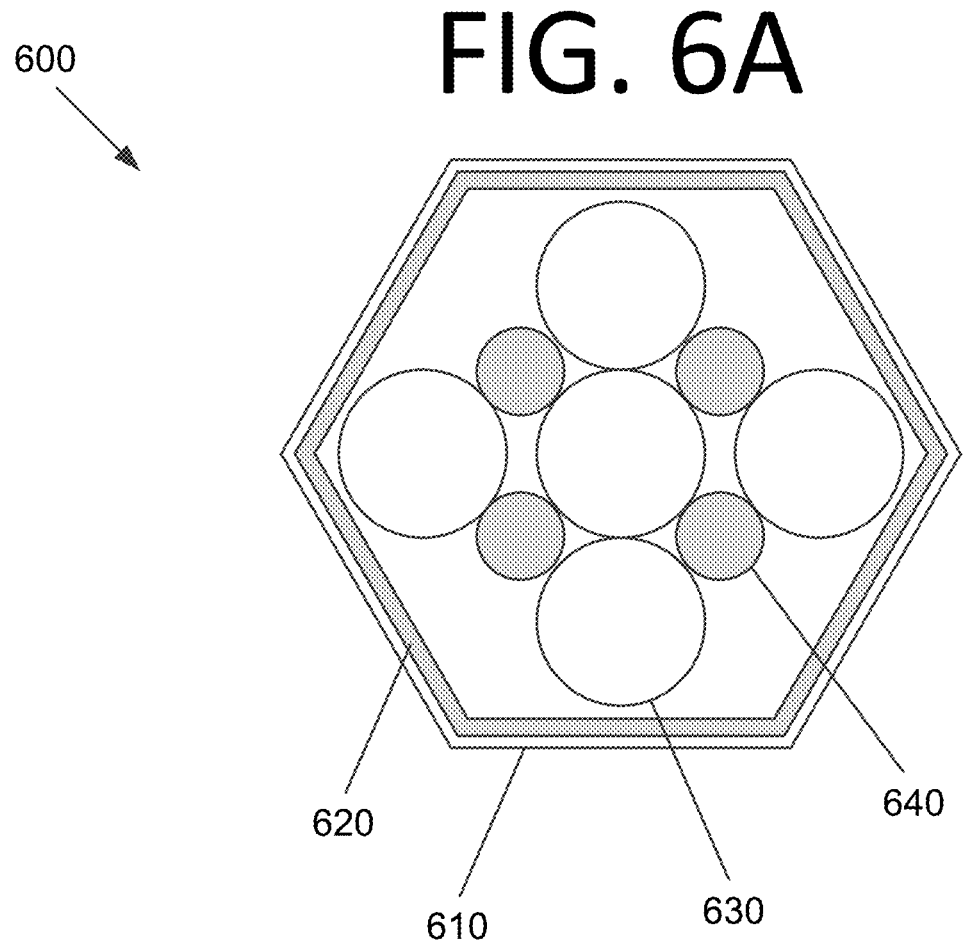

● Fuel rod   ● Moderator rod   ○ Heat pipe
   652              654                656

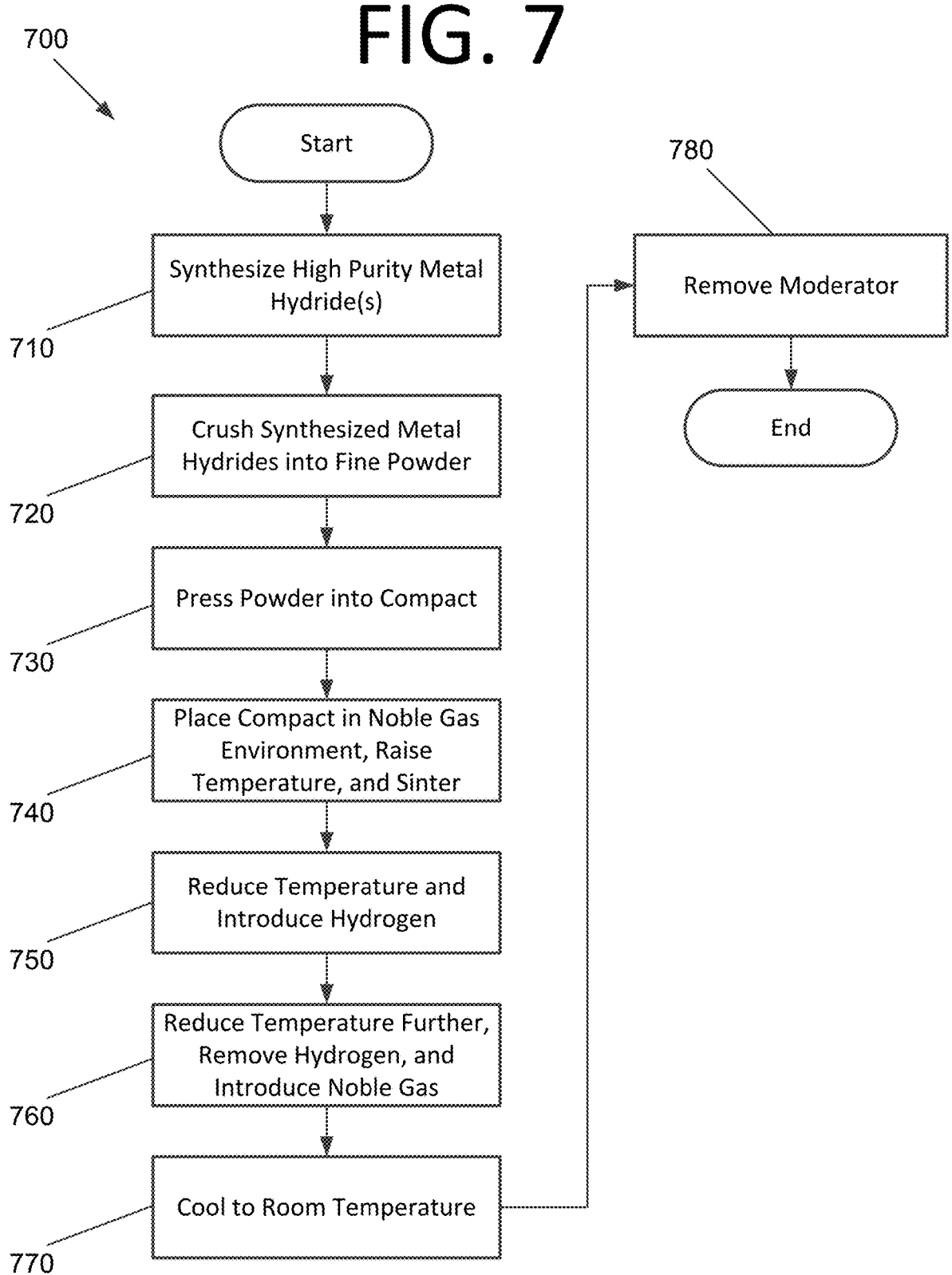

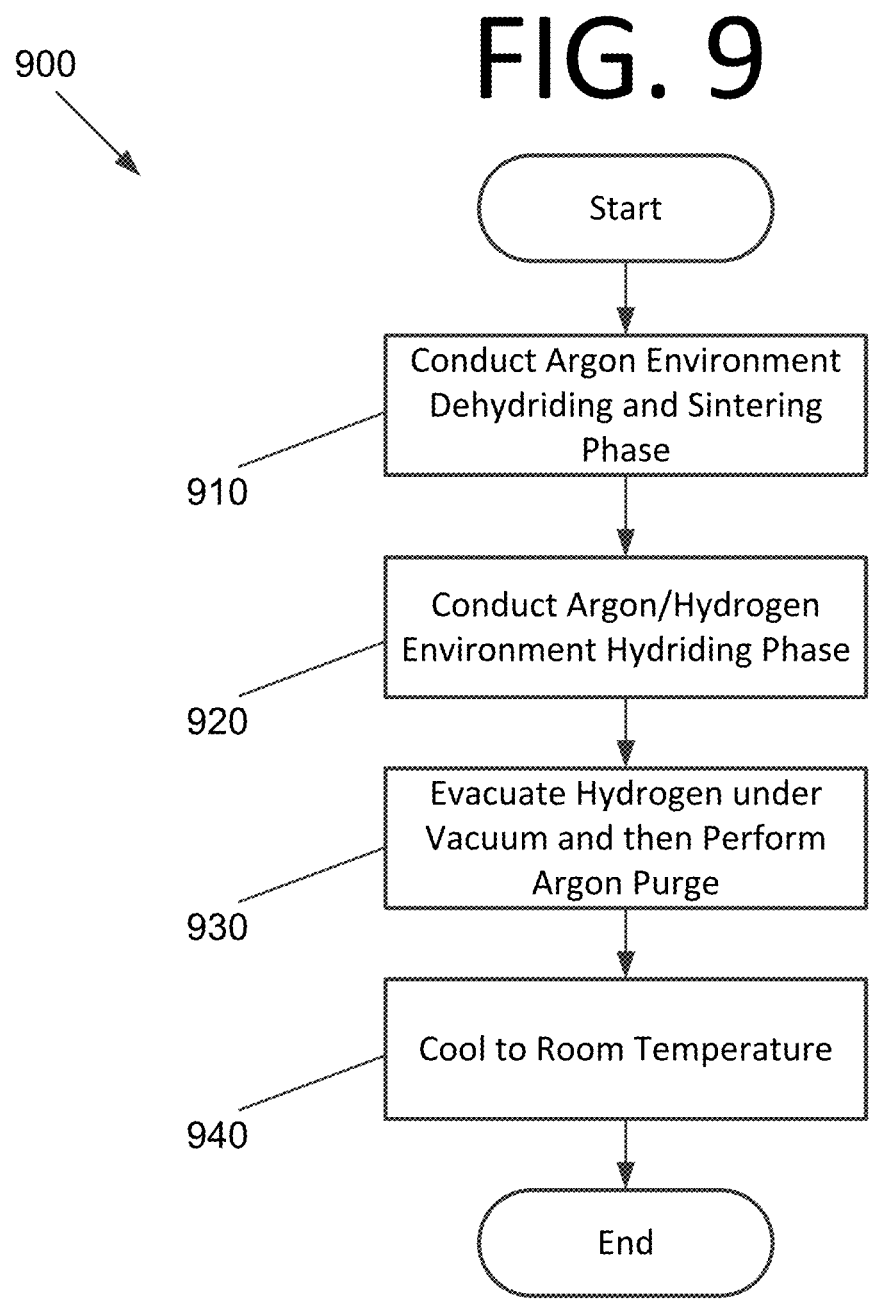

FIG. 19
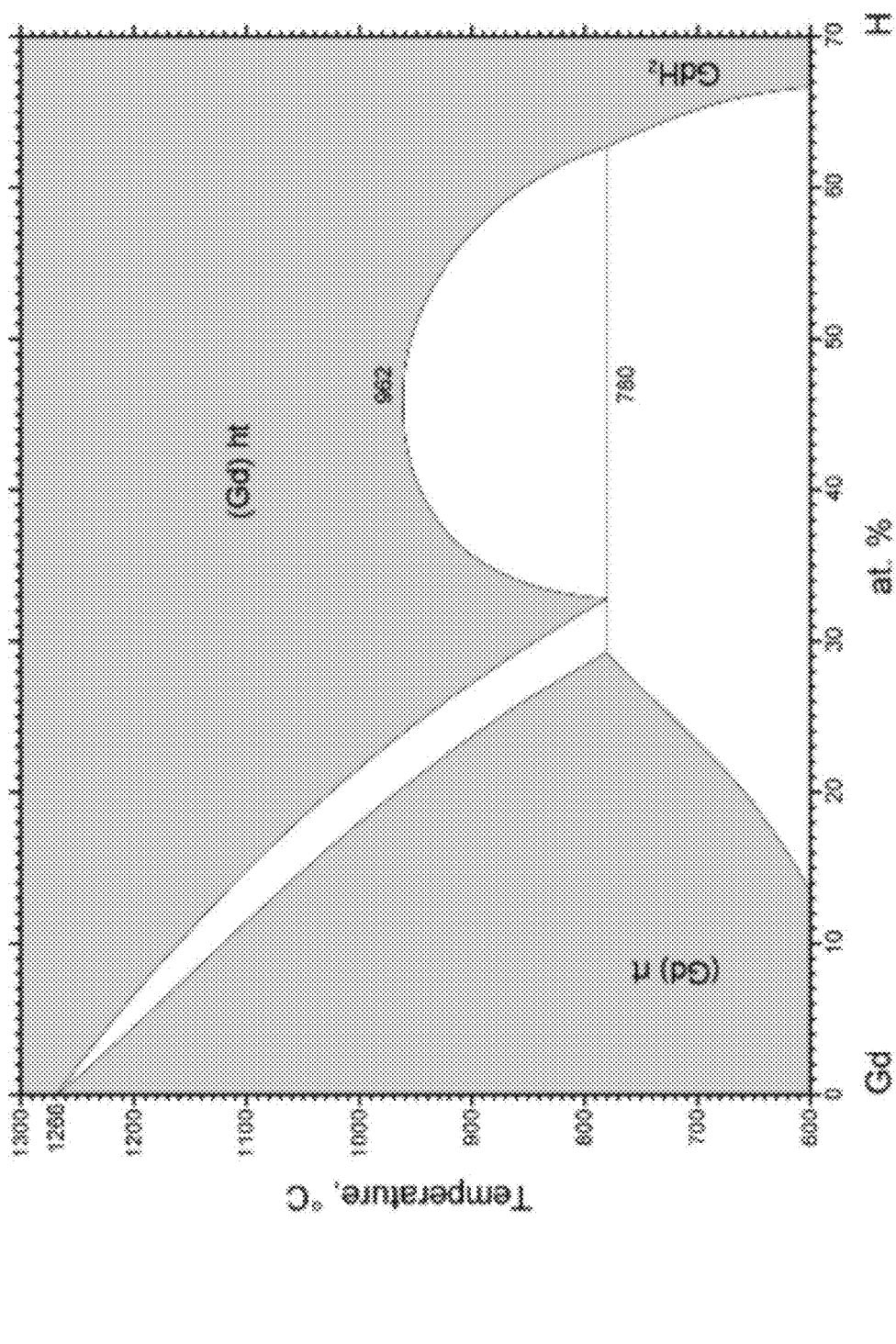

HYDRIDED MODERATORS FOR NUCLEAR REACTORS

CROSS-REFERENCE TO RELATED APPLICATIONS

This application claims the benefit of U.S. Provisional Patent Application No. 62/853,741 filed May 29, 2019, and U.S. Provisional Patent Application No. 62/892,179 filed Aug. 27, 2019. The subject matter of these earlier filed applications is hereby incorporated by reference in its entirety.

STATEMENT OF FEDERAL RIGHTS

The United States government has rights in this invention pursuant to Contract No. 89233218CNA000001 between the United States Department of Energy and Triad National Security, LLC for the operation of Los Alamos National Laboratory.

FIELD

The present invention generally relates to moderators, and more particularly, to hydrided moderators for nuclear reactors and methods for the production thereof.

BACKGROUND

Moderators are used in nuclear reactors to reduce neutron speeds, allowing neutrons to more efficiently participate in fission reactions with nuclear fuel, such as U-235. Such moderators improve economic competitiveness due to improved fuel utilization and enhance reactivity control due to prolonged neutron lifetime. In the case of microreactors, effective use of moderators may allow for a reduction of the physical size of the reactor, which may allow the unit to be able to be transported.

Conventional reactors use water, heavy water, beryllium oxide, or graphite to moderate neutrons. For a variety of reasons, conventional moderators are not suitable for use in microreactors. Solid-state hydrogenous moderators, such as lithium hydride (LiH) and zirconium hydride (ZrH), were developed to support high temperature operation. The hydrogen is what moderates the neutrons (i.e., slows them down so that they can more efficiently participate in the fission reaction). If the material releases the hydrogen, then those hydrogen atoms are no longer in a dense state, thus reducing the ability to moderate neutrons. This reduces the reactivity, and thus, reduces power production.

However, these materials were proven to be inadequate as they tended to release hydrogen at temperatures in excess of 500° C. In the case of SNAP-10A, which was the only space reactor deployed by the United States, continuous loss of hydrogen from the U—Zr—H compound resulted in loss of reactivity. In other words, without an active hydrogen charging system, the reactor core became subcritical within several weeks to a few months. Accordingly, improved moderator materials and production techniques may be beneficial.

SUMMARY

Certain embodiments of the present invention may provide solutions to the problems and needs in the art that have not yet been fully identified, appreciated, or solved by conventional moderator technologies. For example, some embodiments of the present invention pertain to hydrided moderators for nuclear reactors and/or methods for the production thereof. The moderators may include one or more metal hydrides. An advantage of metal hydrides is that they have a relatively high hydrogen density. Such moderators may be particularly beneficial since reactors employing them may not require backup hydrogen charging systems and/or specialized moderator cooling systems.

In an embodiment, a method for producing a moderator includes placing a compact including at least one of a metal hydride, a metal alloy hydride, or a combination thereof, into a furnace including a noble gas. The method also includes raising a temperature in the furnace to a first temperature above about 1000° C. and maintaining the first temperature for a period of time, thereby sintering the compact. The method further includes reducing the first temperature in the furnace to a second temperature lower than the first temperature. Additionally, the method includes introducing a first gas including at least about 4% hydrogen into the furnace and maintaining the second temperature for a period of time until a target stoichiometry of a hydride material in the compact is reached. The method also includes evacuating the first gas under vacuum for a period of time and then performing a noble gas purge and reducing the second temperature in the furnace to a third temperature that is lower than the second temperature, removing the hydrogen, and introducing the noble gas. The method further includes cooling the compact, thereby producing a moderator. The moderator has a density that is greater than about 85% of the theoretical density of the hydride material.

In another embodiment, a method for producing a moderator includes placing a compact including at least one of yttrium hydride, a yttrium alloy hydride, zirconium hydride, a zirconium alloy hydride, or a combination thereof, into a furnace including a noble gas. The method also includes raising a temperature in the furnace to a first temperature above about 1000° C. and maintaining the first temperature for a period of time, thereby sintering the compact. The method further includes reducing the first temperature in the furnace to a second temperature lower than the first temperature. The method further includes introducing a first gas including at least about 4% hydrogen into the furnace and maintaining the second temperature for a period of time until a target stoichiometry of a hydride material in the compact is reached. Additionally, the method includes evacuating the first gas under vacuum for a period of time and then performing a noble gas purge and reducing the second temperature in the furnace to a third temperature that is lower than the second temperature, removing the hydrogen, and introducing the noble gas. The method also includes cooling the compact, thereby producing a moderator. The moderator has a density that is greater than about 85% of the theoretical density of the hydride material.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 6A is a top cutaway view illustrating a small nuclear reactor core, according to an embodiment of the present invention.

FIG. 7 is a flowchart illustrating a process for producing metal hydride moderators, according to an embodiment of the present invention.

FIG. 9 is a flowchart illustrating a process for sintering metal or alloy hydride moderators, according to an embodiment of the present invention.

FIG. 19 is a partial temperature-composition phase diagram for the Gd—H system with a low H-content allotropy for Gd.

Unless otherwise indicated, similar reference characters denote corresponding features consistently throughout the attached drawings.

DETAILED DESCRIPTION OF THE EMBODIMENTS

Figure 1:
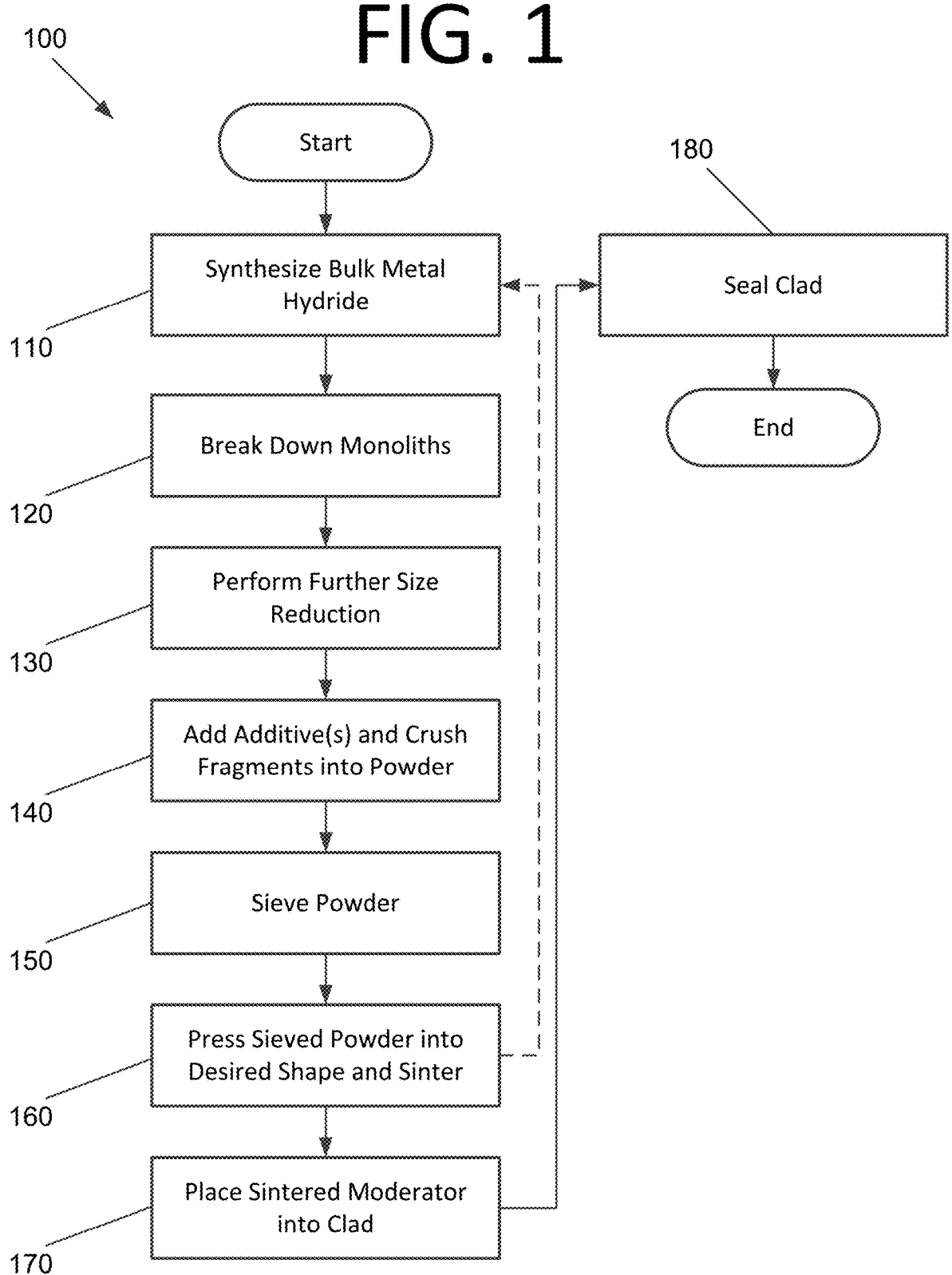
FIG. 1 is a flowchart illustrating a process for producing metal hydride moderators, according to an embodiment of the present invention.

Some embodiments of the present invention pertain to high temperature moderators for nuclear reactors and/or methods for the production thereof. In some embodiments, the moderators are sintered metal and metal alloy hydride moderators. In order to mitigate against the release of high temperature hydrogen compounds, moderators of some embodiments include yttrium and/or thorium. Both yttrium and thorium retain hydrogen in a solution phase at temperatures up to 1,373 Kelvin (K). Use of the moderators of some embodiments may also have added benefit when used to induce spectral shift in fast reactors (e.g., sodium and lead-based fast reactors), which, in turn, magnifies the Doppler reactivity temperature coefficient.

Doppler reactivity feedback occurs due to increased absorption of slower neutrons by the resonances in the absorption cross-section of fertile nuclei, such as U-238. Doppler feedback is inherent to the fuel, and it promptly occurs at the same time scale as the fission, unlike other feedbacks that are triggered by fuel expansion, which is a delayed mechanism. Thus, magnifying the Doppler reactivity temperature coefficient may be beneficial.

A 15-megawatt heat pipe cooled microreactor developed by Los Alamos National Laboratory requires approximately 7,700 kg of uranium compound at 19.75% and weighs approximately 30,000 kg. The reactor can be moved, but requires heavy lifting and transportation equipment. However, with the use of yttrium and/or thorium moderators of some embodiments, the fuel requirement for such a reactor may be reduced to 2,500 kg or less, with an overall weight of approximately 15,000 kg or less. The size of the reactor scales with the requisite output power for heat pipe designs, and microreactors that output less power could be considerably smaller. Additionally, the use of yttrium hydride in some embodiments allows a microreactor design to operate with conventional reactor grade fuel or with TRISO fuel, while at the same time maintaining a relatively low weight.

Embodiments may be used for nuclear reactors with various applications including, but not limited to, nuclear thermal propulsion, microreactors, and/or other nuclear reactors of any size and architecture. Such reactors may use various fuel combinations and may be heat pipe reactors, molten salt reactors, high temperature gas cooled reactors (HTGR), etc. Heat pipe reactors may be particularly beneficial for certain applications due to the potential to produce relatively small, self-regulating reactors, where reactor power can be varied to reflect power needs without requiring active controls or on-site operators. For instance, space vehicles and vehicles that dive underwater or drill underground may especially benefit from such reactors as their power systems. Heat pipes may be used to cool the reactor core and metal hydrides of some embodiments may be used as moderators due to their relatively high hydrogen density.

Use of a hydrogenous moderator for such reactors to thermalize neutrons enhances the fuel utilization and cost-effectiveness of the reactor while keeping the core portable. Yttrium dihydride ($YH_2$) is a promising candidate metal hydride for this application due to its high thermal stability, relatively low thermal neutron absorption cross section, ability to retain H over a larger temperature range than other known hydrogenous media, and good mechanical properties for a rare earth hydride. In other words, the moderators can be formed and machined without falling apart. Most metal hydrides suffer from pulverization upon formation. However, despite these advantages, it is difficult to produce $YH_2$, monoliths and other hydride monoliths in geometries required for reactor design concepts.

Challenges in producing yttrium dihydride monoliths in complex geometries arise due to the inherent material challenges associated with hydriding. For instance, the hydrogen absorption reaction is associated with accommodation of hydrogen atoms into the interstitial sites of the metal sublattice, resulting in a significant volume expansion of approximately 4.4% and embrittlement with severe cracking. Massive hydriding may thus result in structural degradation. Also, hydride formation by direct reaction between metal and hydrogen gas is typically done in evacuated, isolated vessels with strict pressure control to ensure product purity. Due to the issues accompanying the production of large-scale, leak-free hydrogen pressure vessels, large and/or complex shapes of metal hydrides are difficult to fabricate using direct hydriding techniques. Also, hydriding directly tends to expand defects, and expansion typically does not occur uniformly.

To that end, some embodiments provide different production techniques for metal hydride monoliths that alleviate the issues presented by direct hydriding techniques. One such technique makes use of powder metallurgy, where a pre-hydrided metal is crushed into a powder, pressed into a specified shape, and then sintered into a high-density compact.

The moderators of some embodiments may have various shapes and sizes, including, but not limited to, wafers, cylinders, pucks, and/or rods. More complex shapes may also be produced. Indeed, moderators of any desired shape and size may be produced without deviating from the scope of the invention.

Production processes have been developed for large scale fabrication and canning (i.e., cladding) of moderators made from materials such as yttrium hydride and thorium hydride. The moderators may be clad in molybdenum, for example, to further improve stability. Such a cladding may reduce or minimize hydrogen compound leakage.

High density (e.g., greater than 80%, 85%, 90%, 95%, etc. of theoretical density) near net-shape, hydrides may be created using powder metallurgy. The hydride(s) may be crushed, and low-density compacts may be made using standard powder metallurgical processes, and then sintered into near net-shapes in the absence of oxygen. The innovative features of the process of some embodiments include, but are not limited to: (1) the optimization of the control of secondary phase formation and stoichiometry; (2) the optimization of coatings and claddings that minimize hydrogen leakage; and (3) providing spectral tuning of neutron energy and inherent safety.

Such moderators are included in the core of the reactor, and the actual location(s) may be specific to the reactor design. For instance, in some designs, the fuel is sandwiched between moderator plates. In heat pipe designs, for instance, moderators of a suitable shape (e.g., plates, cylinders, hexagons, etc.) may be positioned adjacent to fuel pins.

FIG. 1 is a flowchart illustrating a process 100 for producing metal hydride moderators, according to an embodiment of the present invention. The process begins with synthesizing one or more bulk metal hydrides at 110, such as yttrium hydride, thorium hydride, or any other suitable hydride without deviating from the scope of the invention, into at least one monolith. For instance, hydrides of cerium (Ce), calcium (Ca), zirconium (Zr), scandium (Sc), beryllium (Be), and/or lithium (Li) may be used in some embodiments in addition to or in lieu of yttrium hydride and/or thorium hydride. An advantage of yttrium hydride, for example, is that it tends to have high temperature stability (i.e., it retains hydrogen at much higher temperatures). Also, in the case of Ca, Li, and Be, hydrides of these elements may melt. In some embodiments, the synthesis of the bulk metal hydride(s) may be performed in a Sievert's apparatus, for example, which includes a gas manifold with a series of tubes and valves connecting a sample chamber to one or more pressure reservoirs of known volume. A Sievert's apparatus may be used for measuring the thermodynamics of hydrogen sorption onto metal samples.

Trace element contents (in weight parts per million (ppm)) of yttrium metal used in some embodiments are listed below in Table I.

| | Element: | | | |
|---|---|---|---|---|
| | Ta | TM (excl. Y and Ta) | RE Metals | Other |
| Composition (wt. ppm) | 2400 | 430 | 130 | 470 |

Contents above are for tantalum, transition metals (TM) excluding Ta and Y, rare earth (RE) metals, and other elements (i.e., alkaline earth metals, alkali metals, other metals, non-metals, and metalloids, in order of concentration).

Metal samples may be placed onto molybdenum foils and loaded into a quartz reaction vessel, which is then attached to a gas manifold and placed inside a tube furnace. All gas manifold connections may include fittings (e.g., Swagelok VCR® fittings) using silver-plated nickel gaskets, for example, to provide a leak-tight seal.

Figure 2:
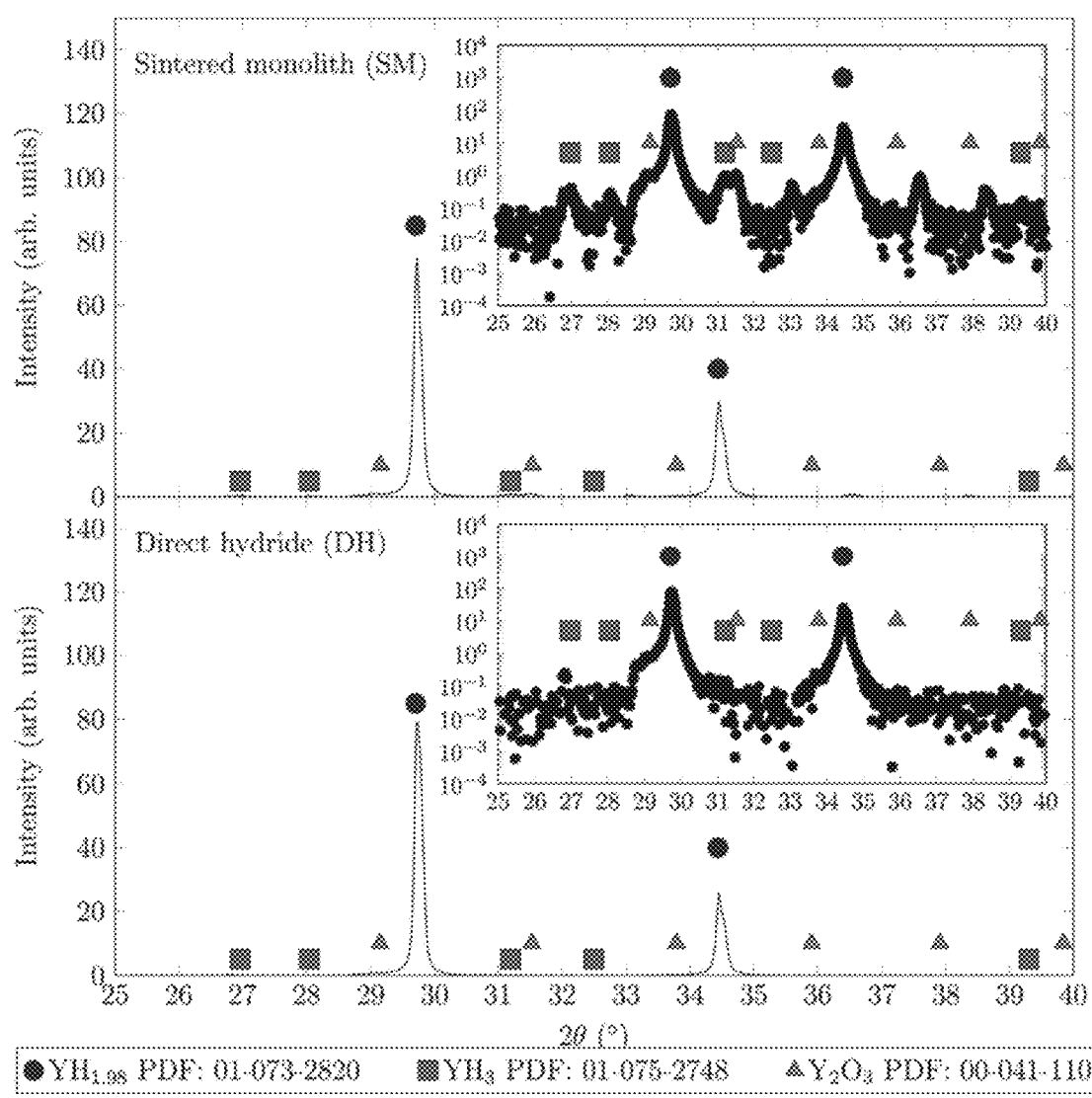
FIG. 2 illustrates XRD patterns for directly hydrided yttrium and a sintered monolith, according to an embodiment of the present invention.

In some embodiments, hydrogen dosing may be performed between 1,083 and 1,103 K by slowly aliquoting hydrogen over a period of 6-8 days. The final product of this dosing is a brittle, air-stable solid that is able to be dry-machined. Final stoichiometry may be calculated using the ideal gas law and mass gain. In tests, this corresponded to an H/Y atom ratio of 1.8. Hydrogen content may also be measured using inert gas fusion. In the tests, this was 2.04 wt. %, corresponding to an H/Y atom ratio of 1.85. A monolith formed by direct hydriding of yttrium is shown in FIG. 2 of U.S. Provisional Patent Application No. 62/853, 741, for example, the benefit of which is claimed by the subject application. Examples of dry-machining are visible on the upward-facing side.

Referring back to FIG. 1, monoliths of hydride metal (e.g., yttrium dihydride and/or thorium dihydride) are broken down into pieces at 120. These monolith pieces are then further reduced at 130. In some embodiments, the monolith pieces may be introduced into a glovebox line (e.g., a high purity argon glovebox line) for further size reduction. It should be noted that any inert gas may be used without deviating from the scope of the invention. Also, in certain embodiments, the entire process of breaking down the fragments is performed in a glovebox. However, any suitable mechanism(s) may be used without deviating from the scope of the invention. In some embodiments, the fragments generated in the glovebox line may be 1 gram (g) or less.

Additive(s) (e.g., binder) may be included with the fragments at 140, and then the fragments may then be crushed into a powder, also at 140. This may be accomplished using a high energy ball mill, for example. The additive in some embodiments may be a binder, such as a 0.25 wt. % ethylene bis(stearamide) (EBS) binder, for example. However, in some embodiments, a binder or other additive(s) may not be added. However, the binder may be helpful for handling of the green pellets in some embodiments. The binder may help maintain the structural integrity of the green pellet, and boil off during sintering.

After a desired amount of time (e.g., 30 minutes in some embodiments) depending on the machinery that is used and how fine of a powder is desired, the powder is sieved at 150 to separate out larger particles. For instance, a 325-mesh sieve may yield a mean particle size of less than 44 micrometers (μm). However, any suitable sieve mesh and/or mean particle size may be used/produced without deviating from the scope of the invention.

The sieved powder may then be pressed into the desired shape to form a green body (i.e., a pre-sintered body) and sintered at 160. For example, the hydrided metal powder may be pressed at a desired pressure (e.g., 150 megapascals (MPa)) using a punch and die set (e.g., a 5.2-mm diameter punch and die set). The sintering may occur in a tungsten mesh furnace for 10 hours, for example. In the case of yttrium dihydride, the theoretical density is 4.28 g/cm³. Moderators made from various material and alloy hydrides may have greater than 80%, 85%, 90%, 95%, etc. of the theoretical density. Hydride stoichiometry may also be controlled during sintering. Hydrogen stoichiometry is dependent on the partial pressure of hydrogen and temperature. The stoichiometry may be altered by tweaking the sintering step such that hydrogen stops flowing at a certain temperature. This provides stoichiometry control. The process may then return to step 110 to produce more moderators.

Once the desired number of moderators have been produced, the moderators may then be placed in a clad at 170. The clad may be a molybdenum clad, for instance, and the moderators may be held in place via retaining pins. In some embodiments, multiple layers of moderators may be stacked on top of one another. The clad may then be sealed at 180 by welding a lid onto the clad, for example.

Three sintered pellets of yttrium dihydride produced by an embodiment of process 100 were analyzed using resonant ultrasound spectroscopy (RUS). For each sample, 30 to 50 resonances were obtained, and inversion was within 0.5% root mean square (RMS) error. Assuming each sample was comprised of a polycrystalline, isotropic material, the independent moduli are $C_{11}$ and $C_{44}$. From these two values, the shear (G), bulk (K), Young's (E) moduli, and Poisson's ratio (v) were calculated as follows:

$$G = C_{44} \quad (1)$$

$$K = C_{11} - \frac{4}{3}C_{44} \quad (2)$$

$$E = C_{11} - \frac{2(C_{11} - 2C_{44})^2}{2(C_{11} - C_{44})} \quad (3)$$

$$v = \frac{C_{11} - 2C_{44}}{2(C_{11} - C_{44})} \quad (4)$$

A summary of geometric (G) and immersion (I) densities of sintered yttrium dihydride pellets is shown in Table II below. Results are compared with the theoretical density (TD) of $YH_2$. Samples 2, 3, and 4 were also examined using RUS.

TABLE I

GEOMETRIC AND IMMERSION DENSITY MEASUREMENTS OF SINTERED YTTRIUM HYDRIDE PELLETS

| Sample | % TD (G) | % TD (I) |
|--------|----------|----------|
| 1 | 94.18 | 93.85 |
| 2 | 94.79 | 94.30 |
| 3 | 94.37 | 94.08 |
| 4 | 91.25 | 90.49 |
| 5 | 93.12 | 94.90 |
| 6 | 89.82 | 90.40 |

Figure 3:
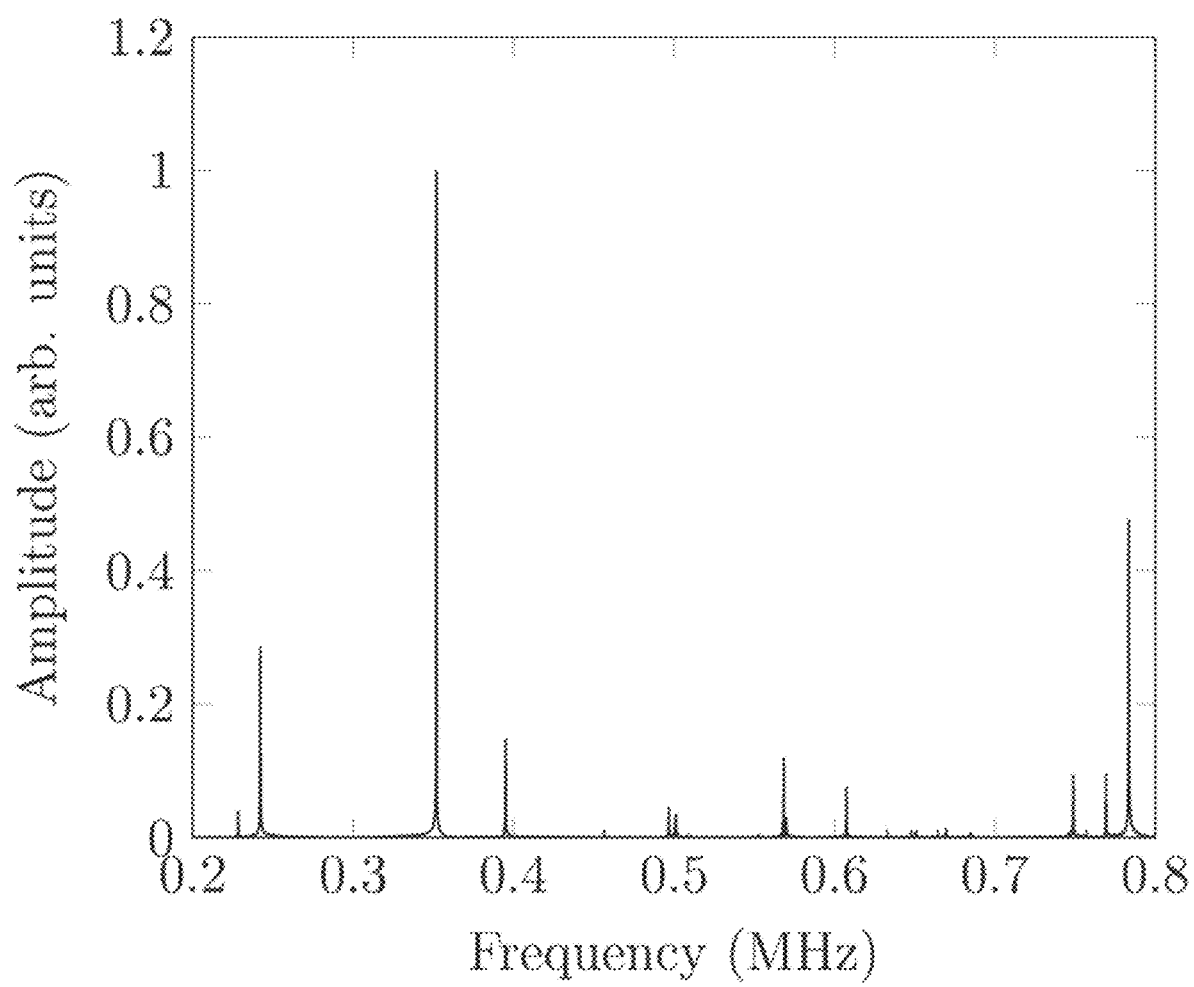
FIG. 3 is a graph illustrating an example resonance spectrum of frequency response obtained from sintering yttrium dihydride and plots resonance amplitude as a function of frequency, according to an embodiment of the present invention.

As can be seen above, the sintered pellets had densities between approximately 90% and 95% of the theoretical density of yttrium dihydride. Images of a 94% dense, sintered yttrium hydride pellet, according to an embodiment of the present invention, are shown in FIG. 3 of U.S. Provisional Patent Application No. 62/853,741, for example, the benefit of which is claimed by the subject application. In FIG. 3 of this provisional application, (A) is an example image of a sintered compact and (B) is a corresponding dark field optical micrograph of an as-fabricated, circular cross-section of the pellet. The sample surface shows a scratch due to handling with tweezers.

Previous work on metal hydride powder metallurgy had suggested that compacts of metal hydrides would be unfeasible due to the low density of pressed compacts and the difficulty of sintering due to potential pulverization from the inability to sinter. Conventionally, this drawback was offset by using a metal matrix, by sintering metal compacts in pure hydrogen, or by arc-melting green bodies (i.e., pre-sintered bodies) with metal powder additives. However, some embodiments employ the novel powder metallurgy process described above to produce high-density sintered compacts (e.g., greater than 80%, 85%, 90%, 95%, etc.) without pulverization or dehydriding during sintering.

Monoliths of yttrium dihydride formed by direct-hydriding in a Sieverts' apparatus and sintered pellets were both analyzed for phase purity using X-ray diffraction (XRD). Diffraction patterns for both materials are shown in graph 200 of FIG. 2, which plots XRD pattern intensity as a function of 2θ. An inset is shown for each pattern using a logarithmic scale for diffraction intensity to emphasize the low intensity peaks due to impurity phases. Patterns were compared with powder diffraction file (PDF) indices for $YH_{1.98}$ (PDF #01-073-2820), $YH_3$ (PDF #01-075-2748), and $Y_2O_3$ (PDF #00-043-0661). Diffraction was performed using Cu Kα (8.04 keV) X-rays. The remaining peaks were identified to be due to other Y-containing oxide phases. The presence of $YH_{3-x}$ emphasizes the importance of environmental control to prevent unwanted secondary phases.

Comparison of the pattern for Sievert's-produced yttrium dihydride with the PDF peak indices shows that the hydrided material was phase-pure yttrium dihydride. A similar comparison for the pattern acquired from the sintered compact indicates that it was not phase-pure yttrium dihydride, but was approximately 1% yttrium trihydride. It was experimentally determined that the trihydride formed during the high energy ball milling step of powder processing or due to residual hydrogen from the sintering step, as the increased temperatures during these steps are able to cause phase transformations in the presence of hydrogen. Although only trace amounts of hydrogen were present in the inert glovebox line used for powder processing, the pressures of hydrogen required to form the trihydride from the dihydride at lower temperatures (less than 200° C.) are relatively low (less than 30 torr) and the high surface areas associated with powders drastically improved the kinetics of transformation.

FIG. 3 is a graph 300 illustrating an example resonance spectrum of frequency response obtained from sintering yttrium dihydride and plots resonance amplitude as a function of frequency, according to an embodiment of the present invention. For the tested $YH_2$ pellet, frequencies are shown between 300 kHz and 600 kHz. These frequencies may include singlet, doublet, and multiplet peaks, which were then indexed and fit to a function using elastic constants as fitting parameters. Error was calculated as the deviation from theoretical values based on geometry and mass.

Elastic constants for yttrium dihydride ($C_{11}$ and $C_{44}$) and the associated RMS values are shown in Table II below. Values are shown with 95% confidence intervals.

TABLE II

ELASTIC CONSTANTS AND ASSOCIATED RMS VALUES FOR YTTRIUM DIHYDRIDE

| Sample # | % TD (I) | $C_{11}$ (GPa) | $C_{44}$ (GPa) | RMS Error (%) |
|---|---|---|---|---|
| 2 | 94.30 | 133.0 ± 1.2 | 47.6 ± 0.4 | 0.470 |
| 3 | 94.08 | 125.8 ± 1.2 | 44.7 ± 0.4 | 0.440 |
| 4 | 90.49 | 113.4 ± 0.6 | 41.0 ± 0.2 | 0.261 |

The data presented here shows a clear effect of density on the measured values. Elastic constants were calculated as described in Eqs. (1)-(4). The Poisson's ratio was found to be independent of density and was calculated as $v=0.221\pm0.003$ (±95% confidence interval (CI)). The Poisson's ratio was also calculated from values from Setoyama et al. and was found to be 0.231. See D. Setoyama et al., "Mechanical properties of yttrium hydride," Journal of Alloys and Compounds 394, 1, p. 207 (2005).

Figure 4:
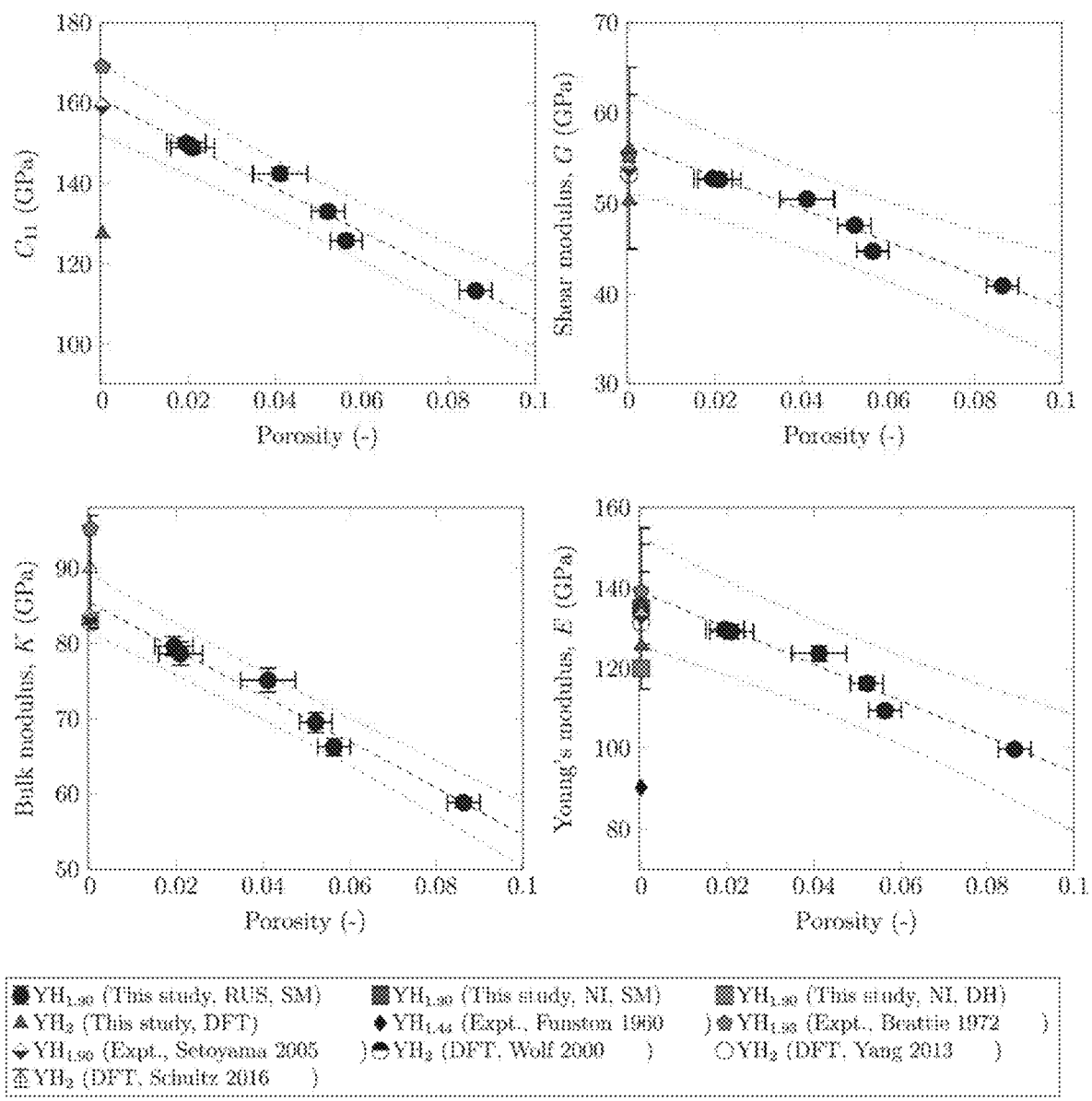
FIG. 4 plots $C_{11}$ (upper left), shear (G) modulus (upper right), bulk (K) modulus (lower left), and Young's (E) modulus (lower right) as a function of density for examined sintered monoliths (H/Y=1.90), according to an embodiment of the present invention.

Graphs 400 of FIG. 4 plot $C_{11}$ (upper left), shear (G) modulus (upper right), bulk (K) modulus (lower left), and Young's (E) modulus (lower right) as a function of density for examined sintered monoliths (H/Y=1.90). Data points are plotted in markers, while the dashed and dotted lines plot the linear fits and 95% confidence intervals, respectively. Results from DFT calculations in this study and literature values are also plotted. Nanoindentation (NI) data of Young's moduli for both directly-hydrided (DH) yttrium and sintered monoliths (SM) were plotted at 100%-density due to crystallite sizes that were much larger than indentation areas.

If a sintered pellet is considered as a mixture between yttrium dihydride and void, then it is possible to use the rule of mixtures to calculate the expected values of the moduli given the density of the sintered compact. This is done in Table IV below for Young's Modulus.

TABLE III

SUMMARY OF MEASURED ELASTIC CONTANTS OF YTTRIUM DIHYDRIDE AND COMPARISON TO RULE OF MIXTURES CALCULATION

| Sample # | % TD (I) | $E_{meas}$ (GPa) | $E_{calc}$ (GPa) | ΔE (GPa) |
|---|---|---|---|---|
| 2 | 94.30 | 116.3 | 122.6 | 6.9 |
| 3 | 94.08 | 109.5 | 122.3 | 13.2 |
| 4 | 90.49 | 99.7 | 117.6 | 18.9 |

This result shows clearly that the rule of mixtures does not completely explain the difference between the values from Setoyama et al. and those obtained from this testing. This could be due to the ~1% yttrium trihydride in the pellet, as determined using XRD. However, only values for bulk moduli of the trihydride exist in Setoyama et al. and the literature generally, and there is a large variation among sources (indeed, a factor of two difference), though all are higher than that of the dihydride here and in other studies.

As described above, high density compacts of yttrium dihydride were sintered from pre-hydrided metal and then examined for pellet density and elastic constants. Some conclusions from this testing are that: (1) sintered pellets exhibited densities close to or above 90% for both geometric and immersion densities; (2) the phase composition of sintered pellets was very close to phase-pure, with approximately 1% of the material as yttrium trihydride, which was found to be due to the ball milling process in the presence of trace amounts of hydrogen; and (3) elastic constants were found to depend on compact density and were lower than values reported in the literature, which was partially attributed to the internal porosity and the small amount of the trihydride in the compacts.

The findings in this testing demonstrate the feasibility of high-density sintered components of yttrium hydride. This represents a significant technical advancement for metal hydride applications in nuclear reactors or hydrogen storage, for example. The effect of porosity on properties will be further studied, and thermal properties of sintered pellets, such as thermal conductivity and thermal expansion, will be measured.

In some embodiments, the moderators may be placed in a clad. For instance, molybdenum rings may be machined by electrical discharge machining (EDM), and lids may also be cut by EDM. Retaining pins may be cut and ultrasonic cleaning may be performed. The components of the clad may then be assembled via electron beam welding.

Figure 5:
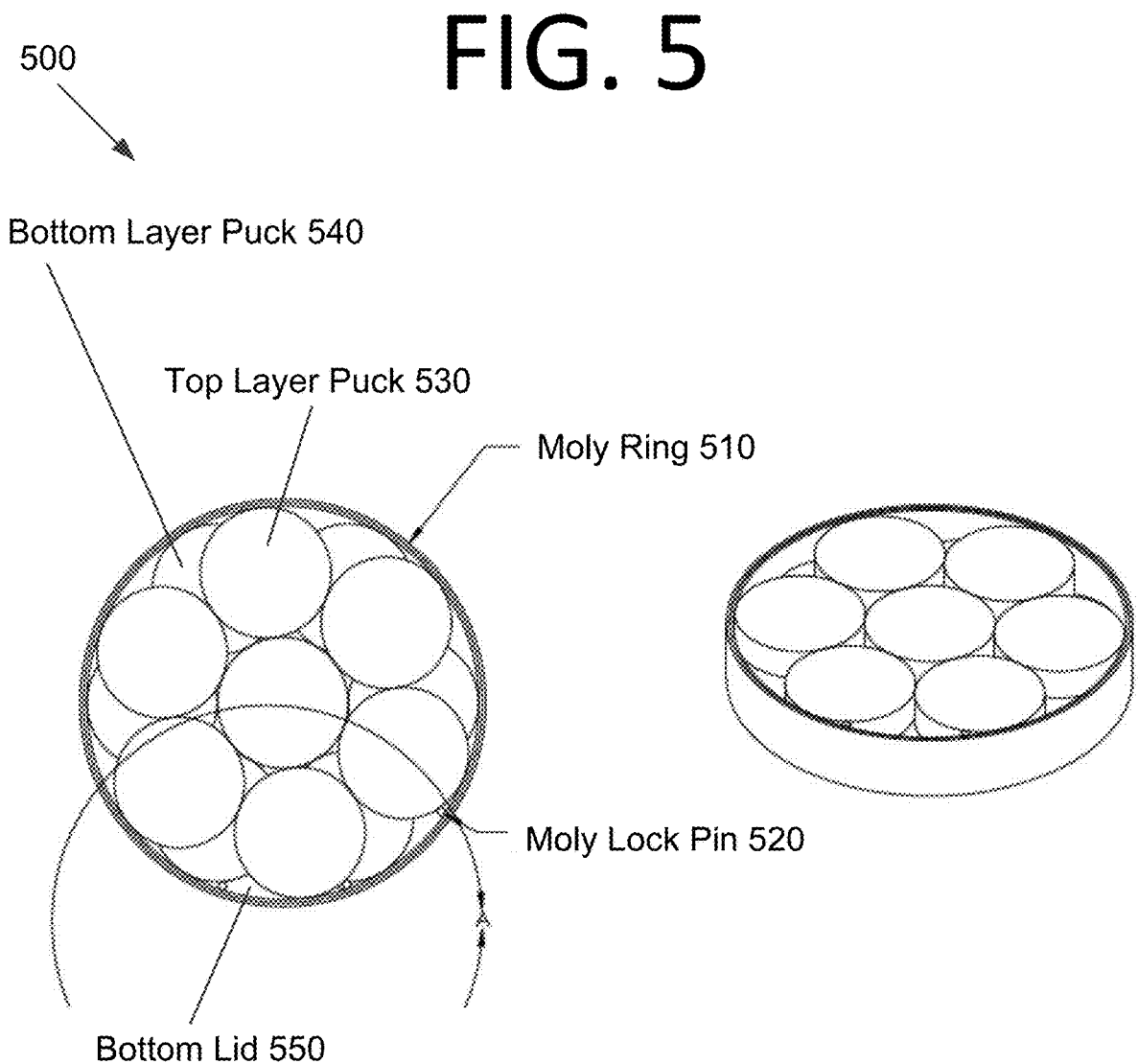
FIG. 5 is a top view and a perspective view illustrating a molybdenum clad moderator disk, according to an embodiment of the present invention.

A molybdenum clad moderator disk 500 is shown in FIG. 5. Moderator disk 500 includes a molybdenum ring 510 and molybdenum lock pins 520. Within ring 510, top layer moderator pucks 530 and bottom layer moderator pucks 540 are held in place via pins 520. Bottom layer pucks sit on a bottom lid 550. Before being placed in a reactor, a lid (not shown here, but visible in FIG. 6, for instance) would be placed over top layer pucks 530 and sealed against ring 510.

FIG. 6A is a top cutaway view illustrating a small nuclear reactor core 600, according to an embodiment of the present invention. Nuclear reactor core 600 includes a reflector 610 and a shroud 620. Fuel rods 630 and moderator disks 640 are interspersed within reactor core 600. In some embodiments, moderator disks 640 may be moderator disk 500 of FIG. 5.

Figure 6B:
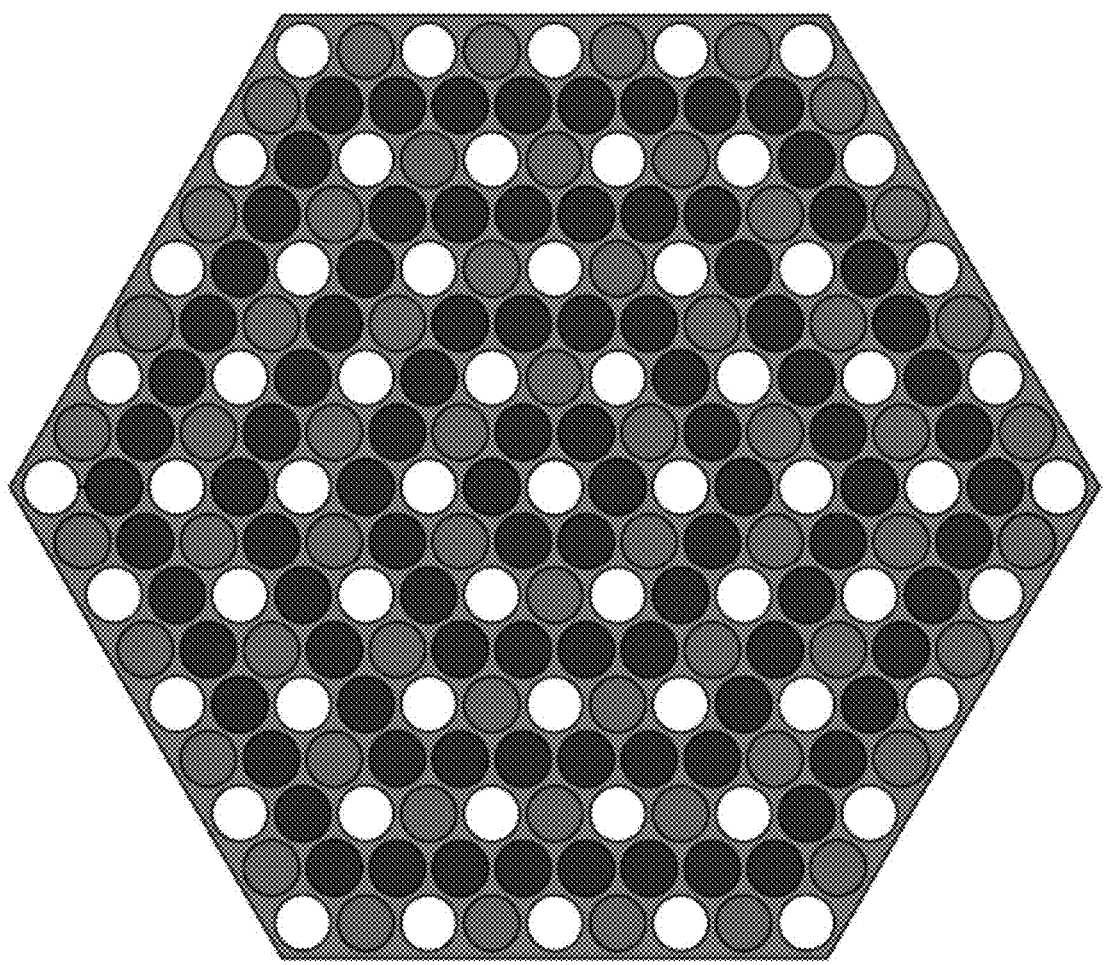
FIG. 6B is a top cutaway view illustrating another small nuclear reactor core, according to an embodiment of the present invention.

FIG. 6B is a top cutaway view illustrating another small nuclear reactor core 650, according to an embodiment of the present invention. Nuclear reactor core 650 includes fuel rods 652, moderator rods 654, and heat pipes 656. Heat pipes 656 are interspersed evenly throughout reactor core 650 in this embodiment. Moderator rods 654 are arranged in hexagons between hexagons of alternating fuel rods 652 and heat pipes 656. However, any suitable reactor shape, number of fuel rods 652, moderator rods 654, and/or heat pipes 656, and/or arrangement thereof may be used without deviating from the scope of the invention.

FIG. 7 is a flowchart illustrating a process 700 for producing metal hydride moderators, according to an embodiment of the present invention. The process begins with making monoliths of one or more high purity metal hydrides at 710. The metal hydride(s) may be yttrium hydride, thorium hydride, etc. The synthesized metal hydride(s) are then crushed into a fine powder (e.g., 44 μm in some embodiments) at 720 and pressed into a compact at 730.

The compact is then placed in a noble gas environment, the temperature is raised, and the compact is sintered at 740. For instance, the temperature may be raised to approximately 1,200° C. in some embodiments. However, in certain embodiments, the maximum temperature may be about 800° C., 1,000° C., 1,100° C., 1,600° C., or any other suitable temperature without deviating from the scope of the invention. The temperature is then reduced (e.g., to approximately 800° C.) and hydrogen is introduced at 750. The hydrogen rehydrides the material, which can be left in this environment as long as needed to fully hydride material. For instance, it may take approximately ten hours to rehydride 2-3 g of material in some embodiments.

The temperature is then reduced further (e.g., to approximately 500° C.), the hydrogen is removed, and a noble gas is introduced at 760. This is performed since cooling under a hydrogen environment causes formation of another phase of the metal hydride, such as yttrium trihydride. Such other phases can be detrimental and cause the moderator(s) to break. The material is then cooled to room temperature at 770 and the moderator is removed at 780.

In some embodiments, rather than hydrides of yttrium or thorium alone, hydrides of metal alloys are used. These alloys may include, but are not limited to, yttrium-cerium and/or yttrium-gadolinium alloys. However, any suitable alloy may be used without deviating from the scope of the invention. For instance, in some embodiments, cerium hydride may be used. In certain embodiments, the cerium and/or gadolinium may be in solution with the yttrium metal.

For testing, yttrium hydride ($YH_{1.9}$, 21.1 grams of hydrogen per kilogram) was prepared by direct reaction of yttrium metal and hydrogen gas at 810-830° C. Molybdenum foils or foil boats were used to prevent contact of the yttrium metal with quartz, from which the reaction vessel was made. However, it should be noted that other vessel tube materials may be used including, but not limited to, $Al_2O_3$, mullite (porcelainite), etc. without deviating from the scope of the invention. The vessel allows for creation of a sealed environment. Molybdenum should be used in some embodiments to prevent unwanted reactions. Molybdenum is relatively inert to $YH_2$ at temperature.

Slow addition of hydrogen was performed using many (60-80) small aliquots over a period of 6-8 days. Monoliths produced by this process were brittle, air-stable solids that could be machined into useful engineering shapes, or could be processed into a powder using current powder metallurgy techniques and formed into a compact to be sintered. The process for forming a compact using any other hydrided metal or alloy is similar.

Figure 8:
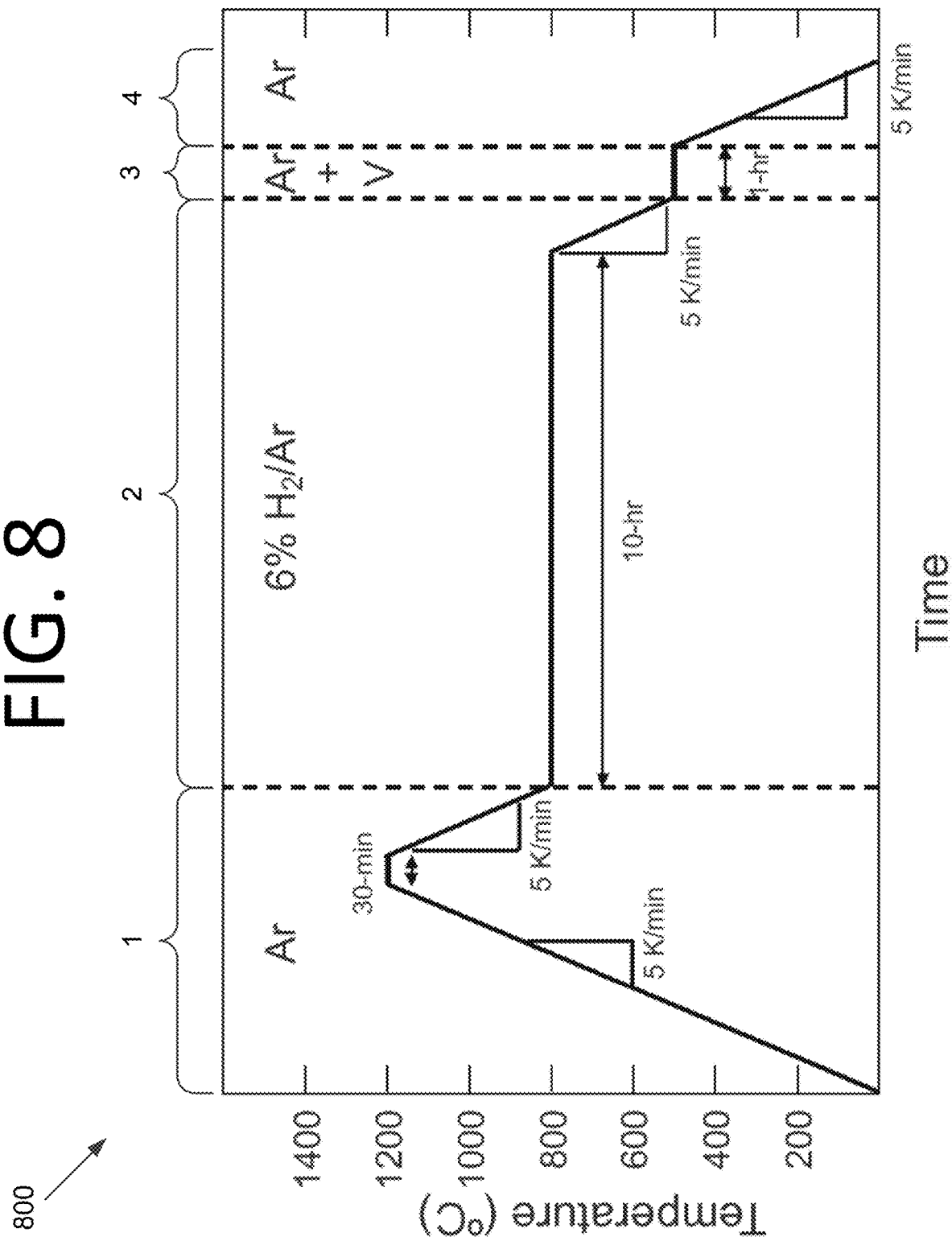
FIG. 8 is a graph illustrating temperature versus time for sintering a hydride metal or alloy compact, according to an embodiment of the present invention.

FIG. 8 is a graph 800 illustrating temperature versus time for sintering a hydride metal or alloy compact, according to an embodiment of the present invention. Four phases are included in the sintering process in this embodiment, denoted 1, 2, 3, and 4. In phase 1, the furnace is steadily brought up to a desired maximum temperature of approximately 1200° C. Here, this was done at a rate of approximately 5 Kelvin per minute in an argon gas environment (e.g., 200 standard cubic centimeters per minute (SCCM)) for 240 minutes. However, any desired noble gas may be used without deviating from the scope of the invention. In certain embodiments, heating may be performed in a vacuum rather than using a noble gas. Upon reaching ~1200° C., this maximum temperature was maintained for approximately 30 minutes. The temperature was then reduced at a rate 5 Kelvin per minute for 80 minutes to reach a temperature of ~800° C.

Slower heating rates can decrease the overall onset of sintering, but generally have fairly minimal impacts on final density. Use of a steady rate is not critical in some embodiments. Indeed, in certain embodiments, faster and/or uneven heating rates may be used. A rapid temperature increase at the end may assist with sintering in certain embodiments. Constant heating rates may be used in some embodiments, however, since it is typically easier than programming in more complex thermal profiles. What may be more important is the temperature that is reached and the hold times.

After reaching this temperature, the phase 2 process of introducing hydrogen begins. In this embodiment, a mixture of hydrogen and argon is flowed into the furnace at a desired SCCM (e.g., ~6% $H_2$/Ar). The pressure of phase 2 is determined by pressure-composition isotherms for the given metal-hydrogen system (e.g., Y—H, Zr—H, Th—H, etc.). This atmospheric composition and temperature were maintained for ten hours, after which the temperature is reduced to ~500° C. over a period of 60 minutes at a rate of 5 Kelvin per hour.

After reaching this temperature, phase 3 begins. In phase 3, the $H_2$/Ar gas is removed, and argon gas alone is introduced. The "V" in this phase denotes that a portion of this step is performed under vacuum. For instance, the vacuum portion of step 3 may last 15-30 minutes in some embodiments to get rid of the $H_2$, and the purge may then be performed using a noble gas (e.g., argon). Aside from this portion of phase 3, all processes in this embodiment were performed in a flowing system at one atmosphere. However, any desired pressure, flow rate, and/or ratio of hydrogen to noble gas may be used without deviating from the scope of the invention.

This temperature is maintained for one hour. After phase 3 concludes, cooling phase 4 begins. The furnace is again cooled at a rate of 5 Kelvin per hour to room temperature. After this phase, the sintered metal or metal alloy hydride moderator is material is complete.

The temperature in phase 2 was tailored to match the gas composition. This temperature was known to result in a hydride with 6% hydrogen. The temperature may be matched to pressure-composition-temperature (PCT) curves. A lower hydrogen concentration could be used. However, this would slow the hydriding rate. Conversely, using a higher hydrogen concentration and a higher temperature may speed up the reaction. The temperature is then lowered in phase 3 since using vacuum steps in phase 2 would result in the loss of hydrogen. In phase 3, the temperature is low enough such that the hydrogen does not appreciably dissociate from the material.

Yttrium retains hydrogen well. However, yttrium requires higher temperatures (e.g., 800° C.) to hydride relatively quickly. Other materials may hydride relatively quickly at lower temperatures. Thus, the hydriding time may be specific to the hydriding material(s) that are used in some embodiments. The sintering temperature and time may also differ for other materials.

It should be noted that the temperatures used in producing sintered metal or metal alloy hydride moderators may differ from those described above. For instance, the process above may work with maximum temperatures of 1080° C. or 1100° C., for example. The maximum temperature generally depends on the material. For cerium, for instance, the temperature may be approximately 800° C., while for zirconium, the temperature may be approximately 1600° C. However, in certain embodiments, the maximum temperature may be about 1,000° C., 1,100° C., or any other suitable temperature without deviating from the scope of the invention. Any suitable temperatures that produce sintered metal or metal alloy hydride moderators may be used without deviating from the scope of the invention.

FIG. 9 is a flowchart illustrating a process 900 for producing sintering metal or alloy hydride moderators, according to an embodiment of the present invention. The process begins with conducting an argon environment dehydriding and sintering phase at 910. However, it should be noted that any noble gas or combination of noble gases may be used for any suitable step of process 900 without deviating from the scope of the invention. During this phase, a compact of hydride metal or a hydride metal alloy is heated to a desired maximum temperature (e.g., a first temperature), maintained at the maximum temperature for a period of time, and then lowered to a second temperature for hydriding.

After reaching the second temperature, hydriding in an $H_2$/Ar environment is performed at 920. This involves bringing the amount of hydrogen to a desired level (e.g., ~6% $H_2$/Ar), maintaining this second temperature for a period of time until the desired stoichiometry is reached (dependent on the mass of the material, the dimensions thereof, and the material permeability/density), and then lowering the furnace to a third temperature that is lower than the second $H_2$/Ar temperature. After reaching this third temperature, the $H_2$/Ar is evacuated under vacuum and then an argon purge is performed at 930. The compact is left in this environment for a period of time so as to prevent or reduce formation of $YH_3$, for example, and the furnace is then cooled to room temperature at 940. After this process, the sintered moderator is ready to be placed in a clad, for example.

Figure 10A:
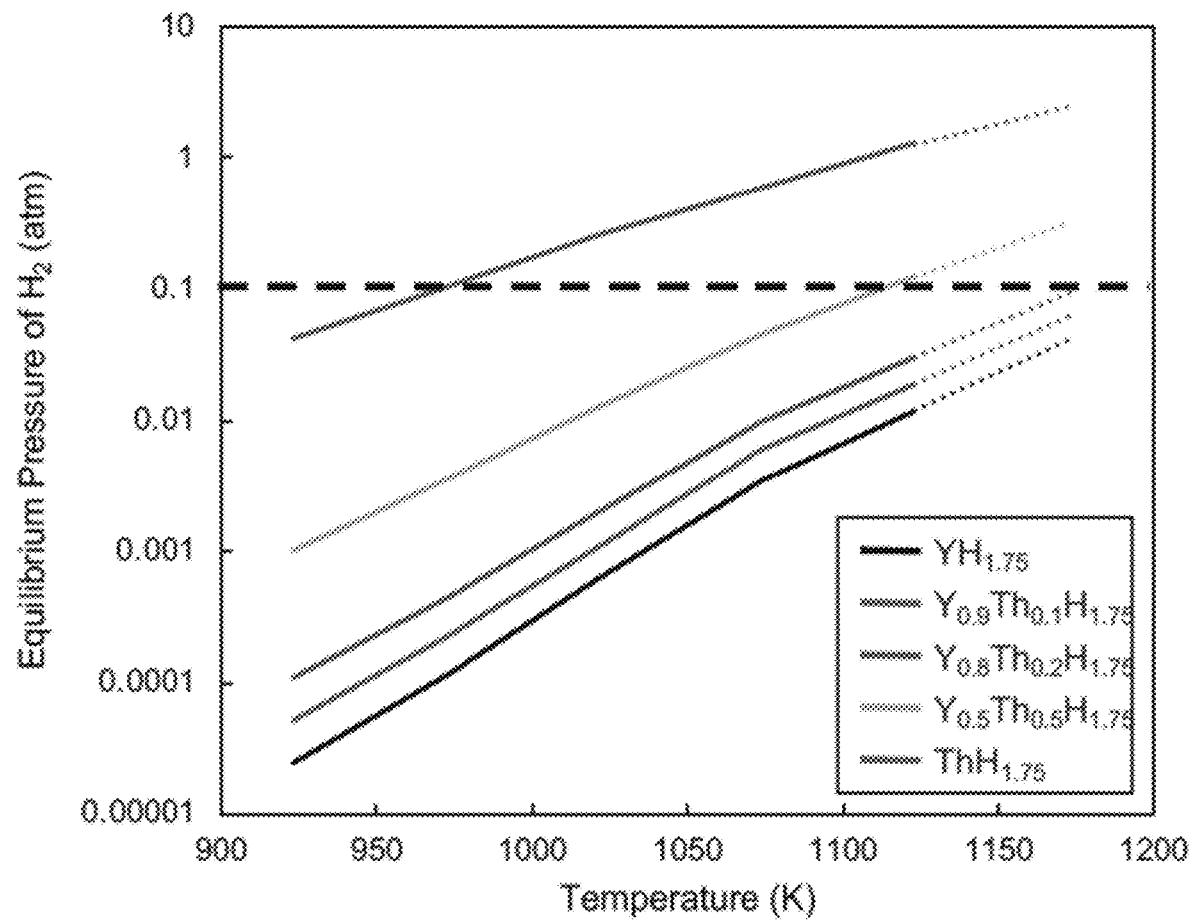
FIG. 10A is a graph illustrating hydriding pressure as a function of temperature for various compositions of Y—Th alloys, according to an embodiment of the present invention.
Figure 10B:
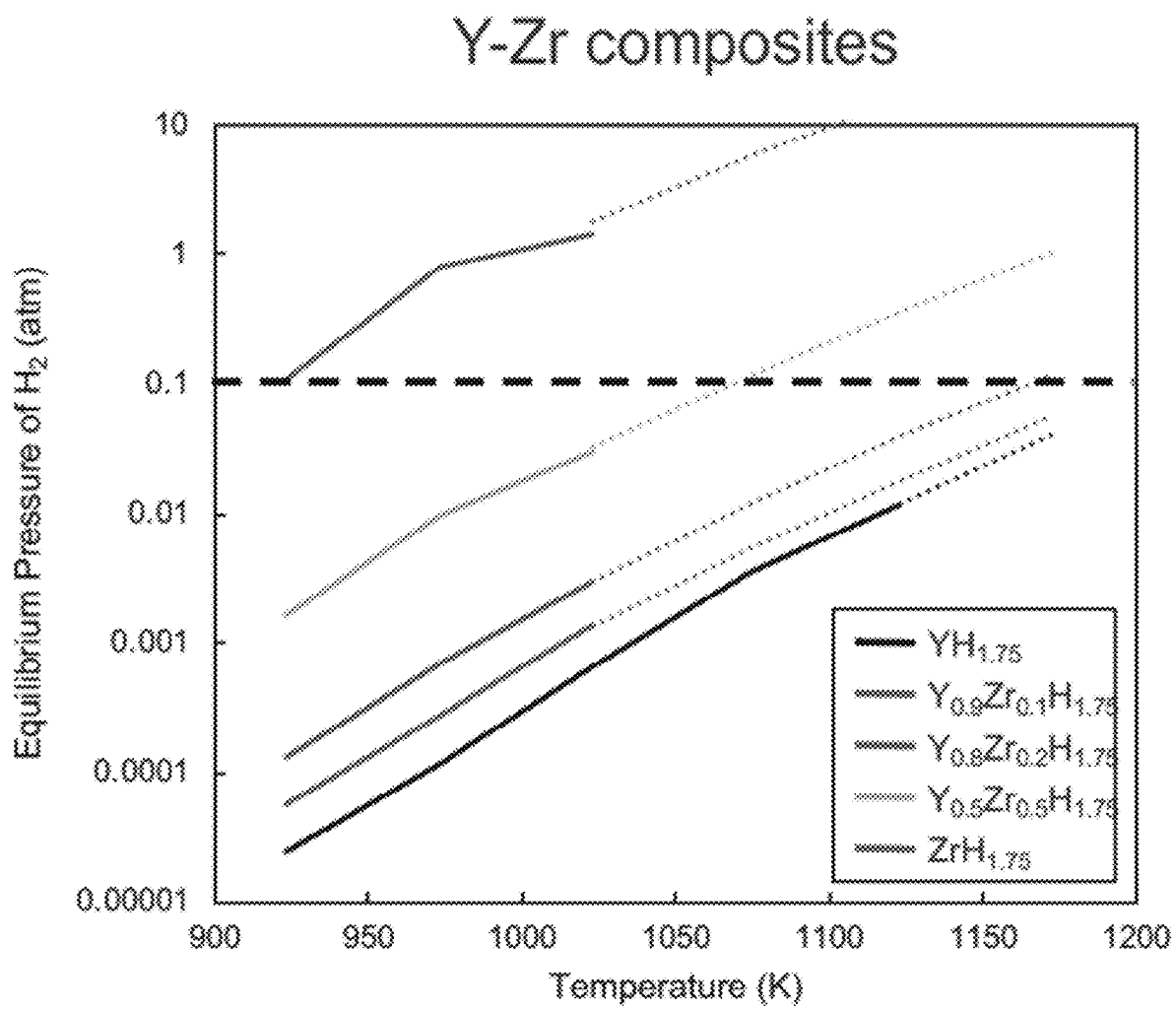
FIG. 10B is a graph illustrating hydriding pressure as a function of temperature for various compositions of Y—Zr alloys, according to an embodiment of the present invention.

FIGS. 10A and 10B are graphs 1000, 1010 illustrating hydriding pressure as a function of temperature for various compositions of Y—Th and Y—Zr alloys, respectively, according to an embodiment of the present invention. While somewhat difficult to see from the grayscale colors, the plot lines are in the inverse order from top to bottom that they are in the legend (i.e., the top plot is the bottom in the legend, the second highest plot is the second from the bottom in the legend, etc.). Reliable performance at 1173 K may require thorium or zirconium compositions of less than 20 atomic percent.

Figure 11:
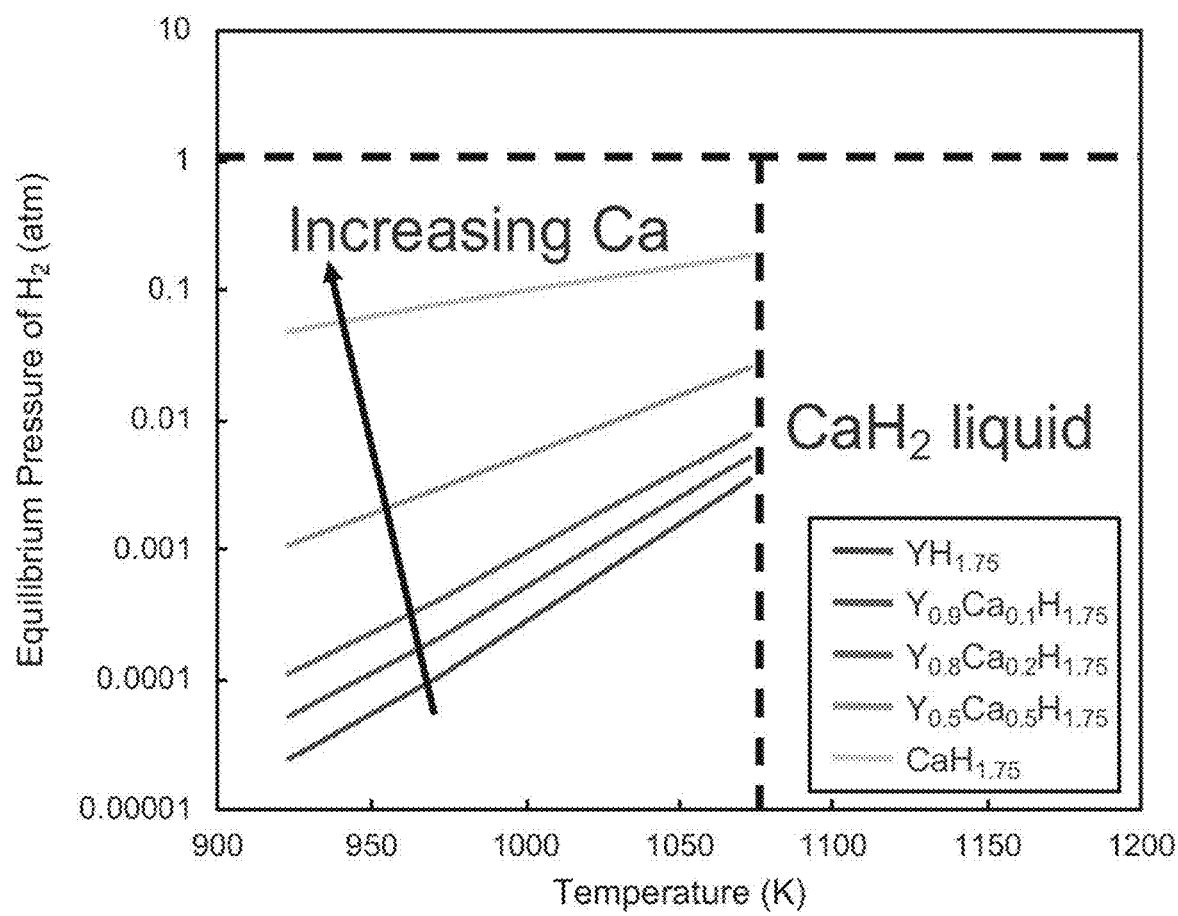
FIG. 11 is a graph illustrating hydriding pressure as a function of temperature for various compositions of $CaH_2$ solids and liquids, according to an embodiment of the present invention.

Calcium hydride is another possible material in some embodiments since it is an ionic hydride. FIG. 11 is a graph 1100 illustrating hydriding pressure as a function of temperature for various compositions of calcium hydride ($CaH_2$) solids and liquids, according to an embodiment of the present invention. The dashed lines demarcate solid and liquid $CaH_2$. At temperatures to the left of the vertical dashed line, $CaH_2$ is solid. At temperatures to the right of the vertical dashed line, $CaH_2$ is liquid.

The darkest and lowest line is $YH_{1.75}$. In increasing order therefrom going up, the compositions are $Y_{0.9}Ca_{0.1}H_{1.75}$, $Y_{0.8}Ca_{0.2}H_{1.75}$, $Y_{0.5}Ca_{0.5}H_{1.75}$, and $CaH_{1.75}$, respectively. Due to its low solubility with yttrium hydride, for example, calcium hydride may be used on its own in some embodiments. Calcium hydride retains hydrogen even while in a liquid state.

Figure 12:
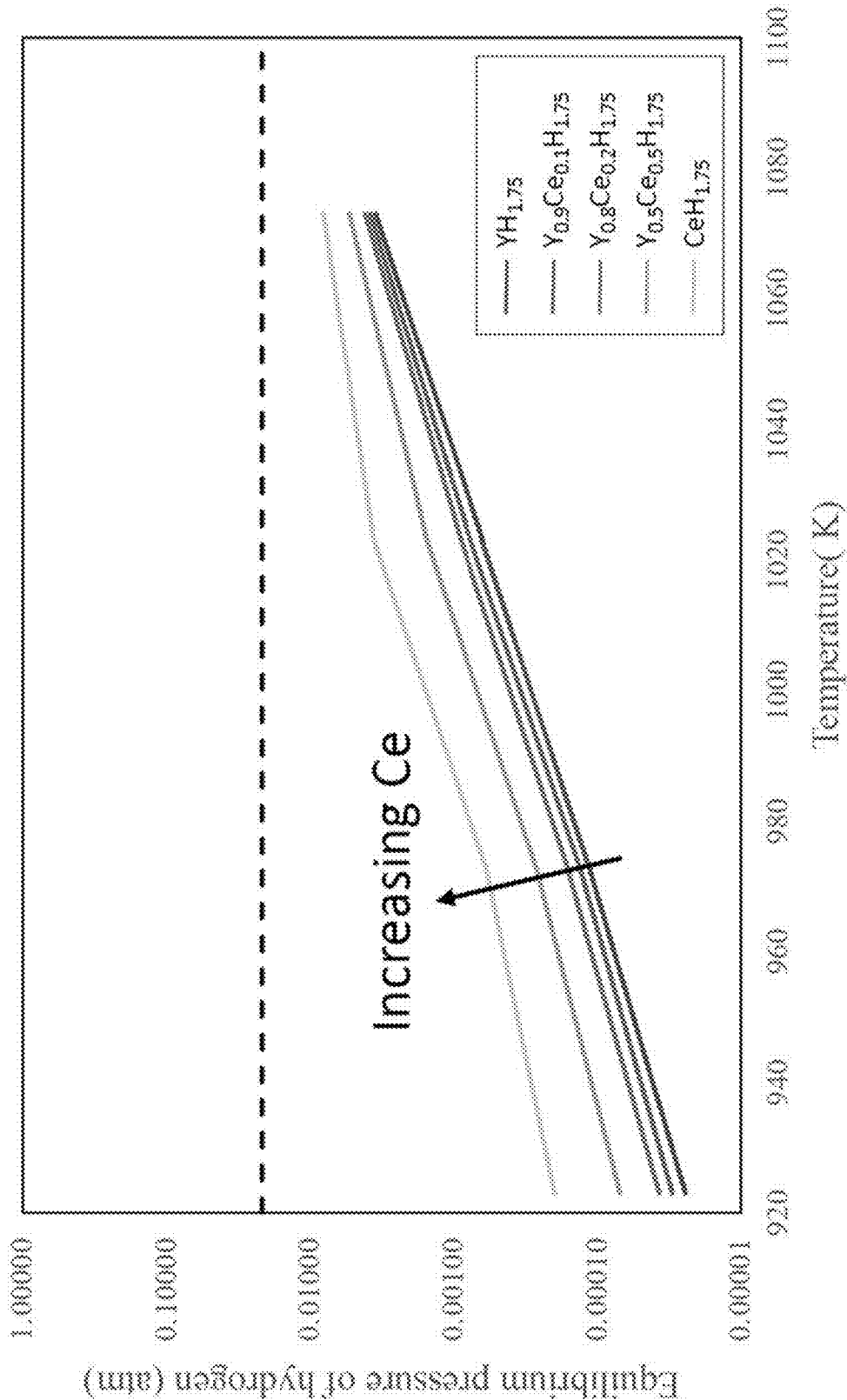
FIG. 12 is a graph illustrating the equilibrium pressure of hydrogen (in atmospheres) at temperatures from 920 K to 1070 K for Y—Ce alloy hydrides for moderator applications, according to an embodiment of the present invention.

FIG. 12 is a graph 1200 illustrating the equilibrium pressure of hydrogen (in atmospheres) at temperatures from 920 K to 1070 K for Y—Ce alloy hydrides for moderator applications, according to an embodiment of the present invention. The darkest and lowest line is $YH_{1.75}$. In increasing order therefrom going up, and as indicated by the arrow, the compositions are $Y_{0.9}Ce_{0.1}H_{1.75}$, $Y_{0.8}Ce_{0.2}H_{1.75}$, $Y_{0.5}Ce_{0.5}H_{1.75}$, and $CeH_{1.75}$, respectively.

Figure 13:
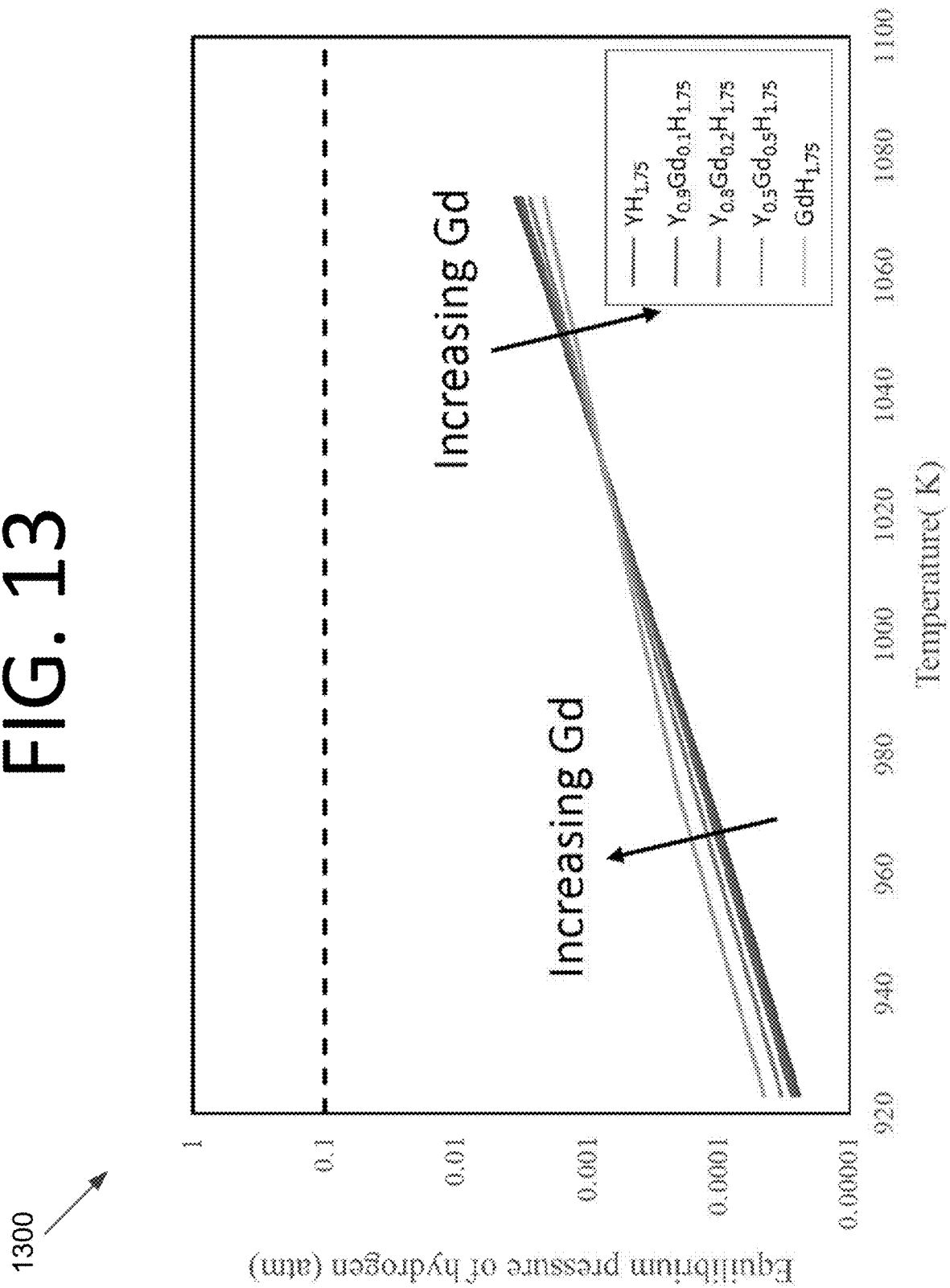
FIG. 13 is a graph illustrating the equilibrium pressure of hydrogen (in atmospheres) at temperatures from 920 K to 1070 K for Y—Gd alloy hydrides for moderator applications, according to an embodiment of the present invention.

FIG. 13 is a graph 1300 illustrating the equilibrium pressure of hydrogen (in atmospheres) at temperatures from 920 K to 1070 K for Y—Gd alloy hydrides for moderator applications, according to an embodiment of the present invention. The compositions from darkest to lightest are $YH_{1.75}$, $Y_{0.9}Gd_{0.1}H_{1.75}$, $Y_{0.8}Gd_{0.2}H_{1.75}$, $Y_{0.5}Gd_{0.5}H_{1.75}$, and $GdH_{1.75}$, respectively. In graph 600, the order of the lines inverts at approximately 1030 K.

Hydriding of Pure Elements

Figure 14:
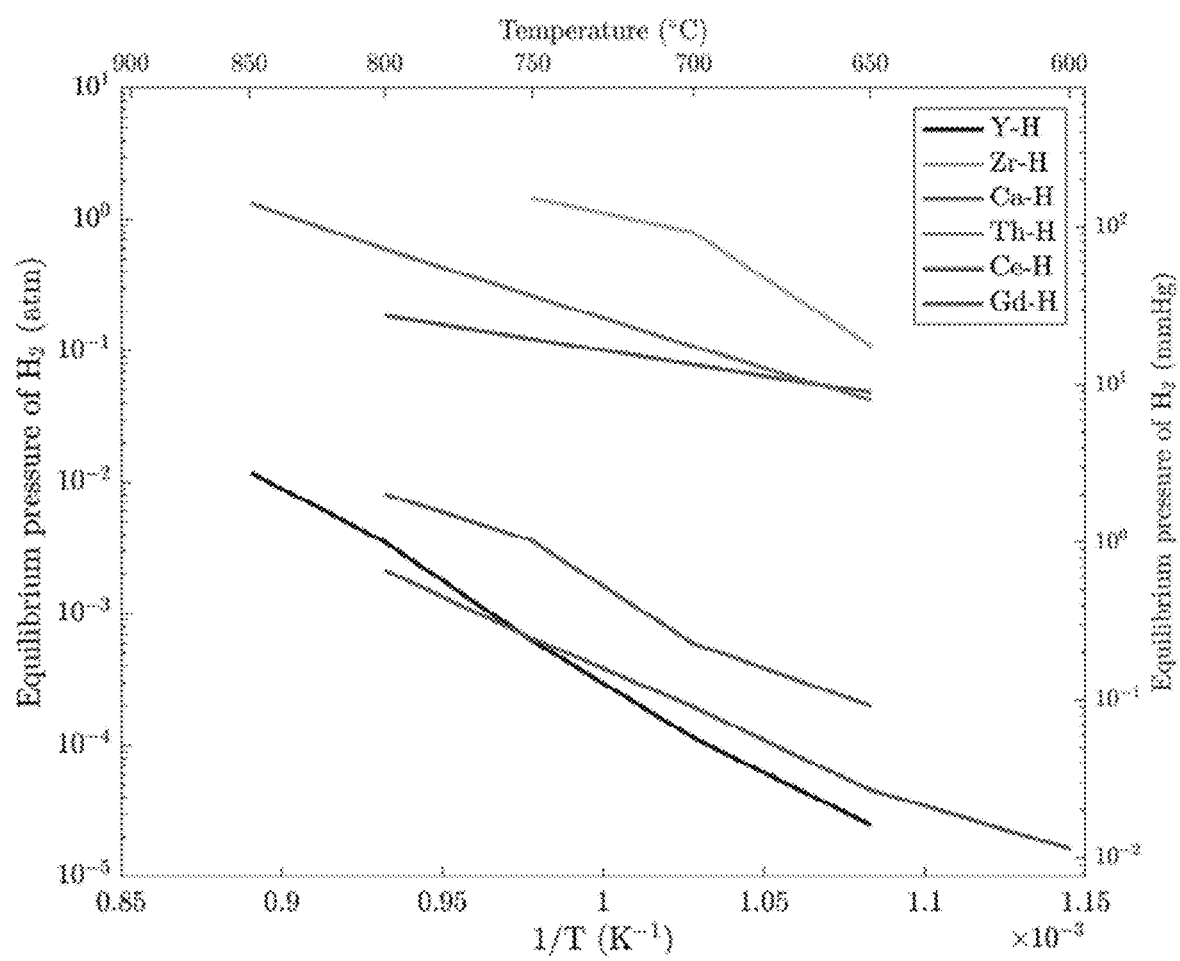
FIG. 14 is a graph illustrating the equilibrium pressure of $H_2$ required to form metal hydrides as a function of 1/T (K-1) for the Y—H, Zr—H, Ca—H, Th—H, Ce—H, and Gd—H systems.

Gadolinium and cerium may be good candidate materials for moderator hydrides since the partial pressures required to hydride Gd and Ce are relatively low, as compared with other composite materials, such as Zr, Th, and Ca. Graph 1400 of FIG. 14 shows a comparison of the partial pressures required to hydride various materials to approximately MH1.7, where "M" is the pure metal. This result shows that the partial pressures required to hydride yttrium, gadolinium, and cerium are two to four orders of magnitude lower than for calcium, thorium, and zirconium. For this reason, Gd and Ce are potential candidates for alloying with yttrium to produce composite hydrides.

An advantage of Gd is its performance as a burnable poison, as is done in conventional nuclear reactors. Ce, on the other hand, may be considered beneficial from an economic standpoint, while also maintaining a low thermal neutron absorption cross-section. The rare earth metals Y, Gd, and Ce may be prepared by Ca-reduction of fluoride salts, which are prepared by reaction of HF with the respective rare-earth oxides. Thus, the processing cost for all three elements is approximately the same, with the principal difference in cost being the feedstock. Currently, yttrium(III) oxide ($Y_2O_3$) is $3/kg, while cerium(IV) oxide ($CeO_2$) is $2/kg. Though the prices are currently similar, the price of $CeO_2$ has remained stable for the past five years, while the price of $Y_2O_3$ has decreased ~81% over that same timeframe.

Figure 15:
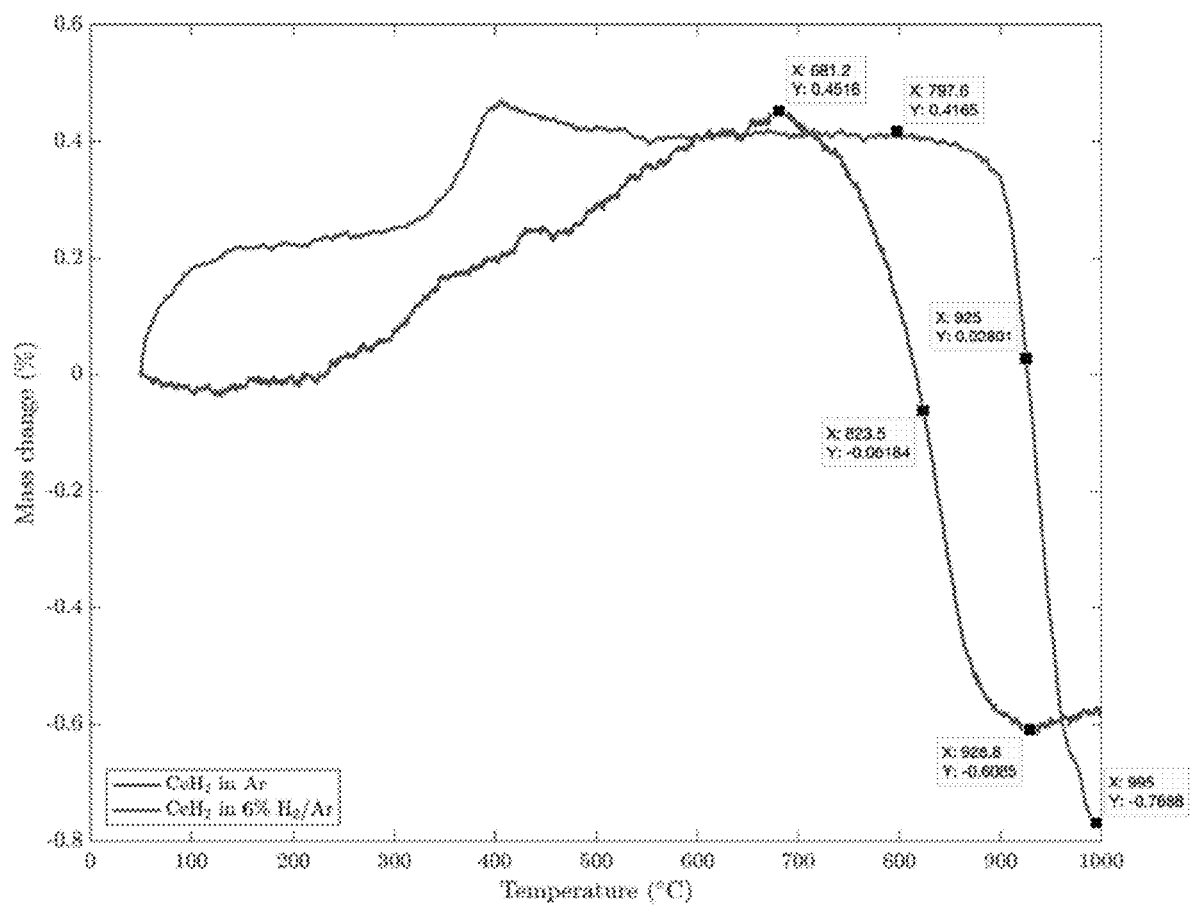
FIG. 15 illustrates thermograms of $CeH_2$ in inert (gettered Ar) and hydrogen-containing (6% $H_2$/Ar) conditions.
Figure 16:
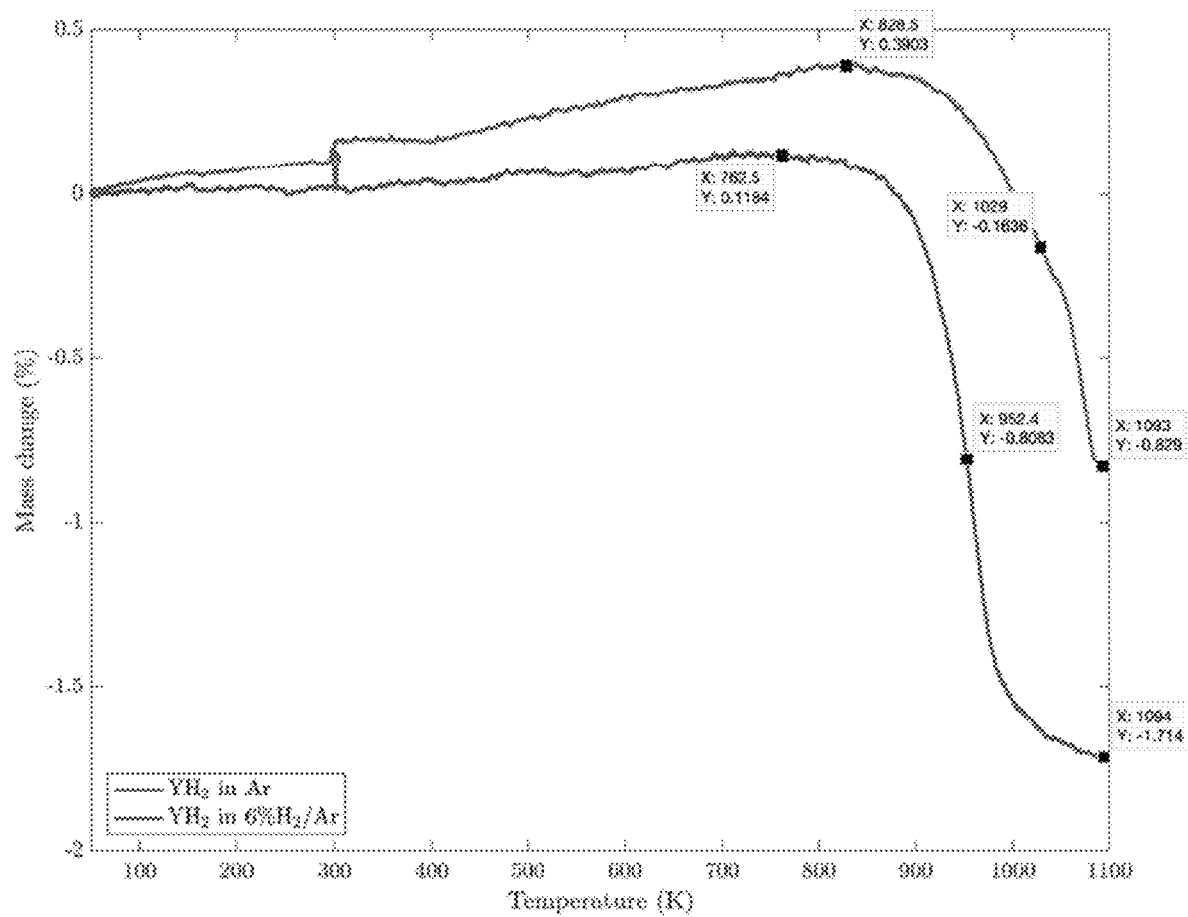
FIG. 16 illustrates thermograms of $YH_2$ in inert (gettered Ar) and hydrogen-containing (6% $H_2$/Ar) conditions.
Figure 17:
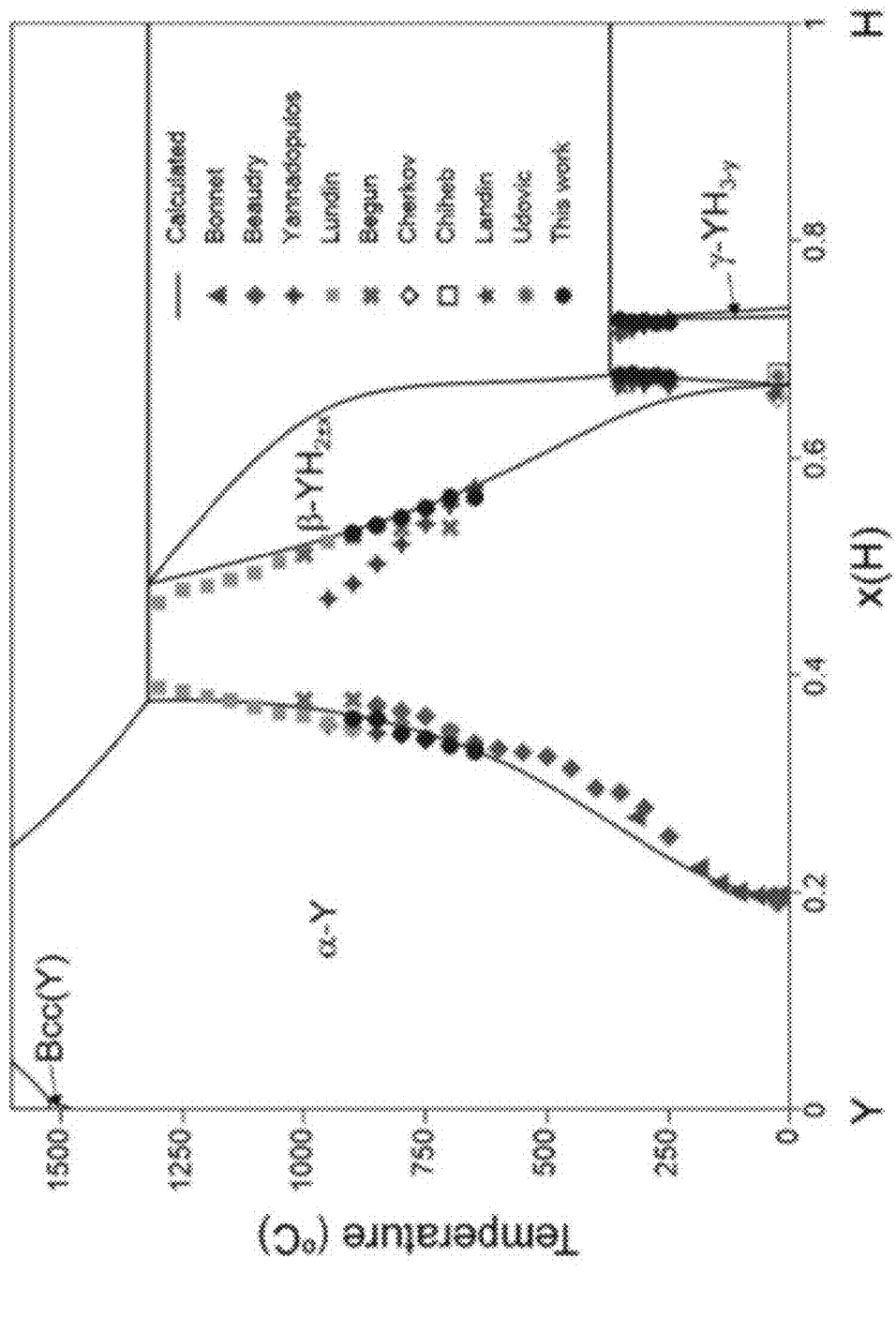
FIG. 17 is a partial temperature-composition phase diagram for the Y—H system.
Figure 18:
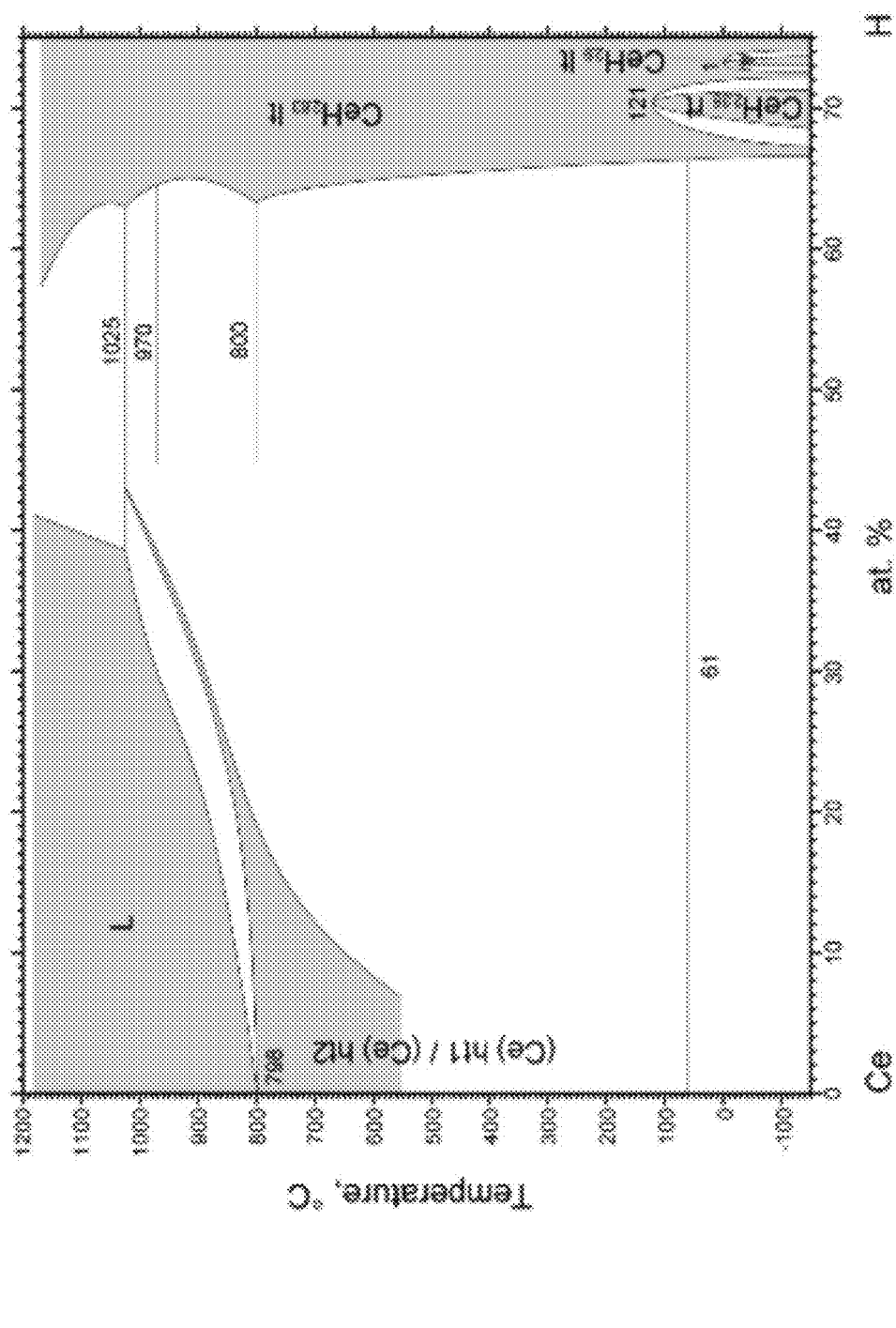
FIG. 18 is a partial temperature-composition phase diagram for the Ce—H system.
Figure 20:
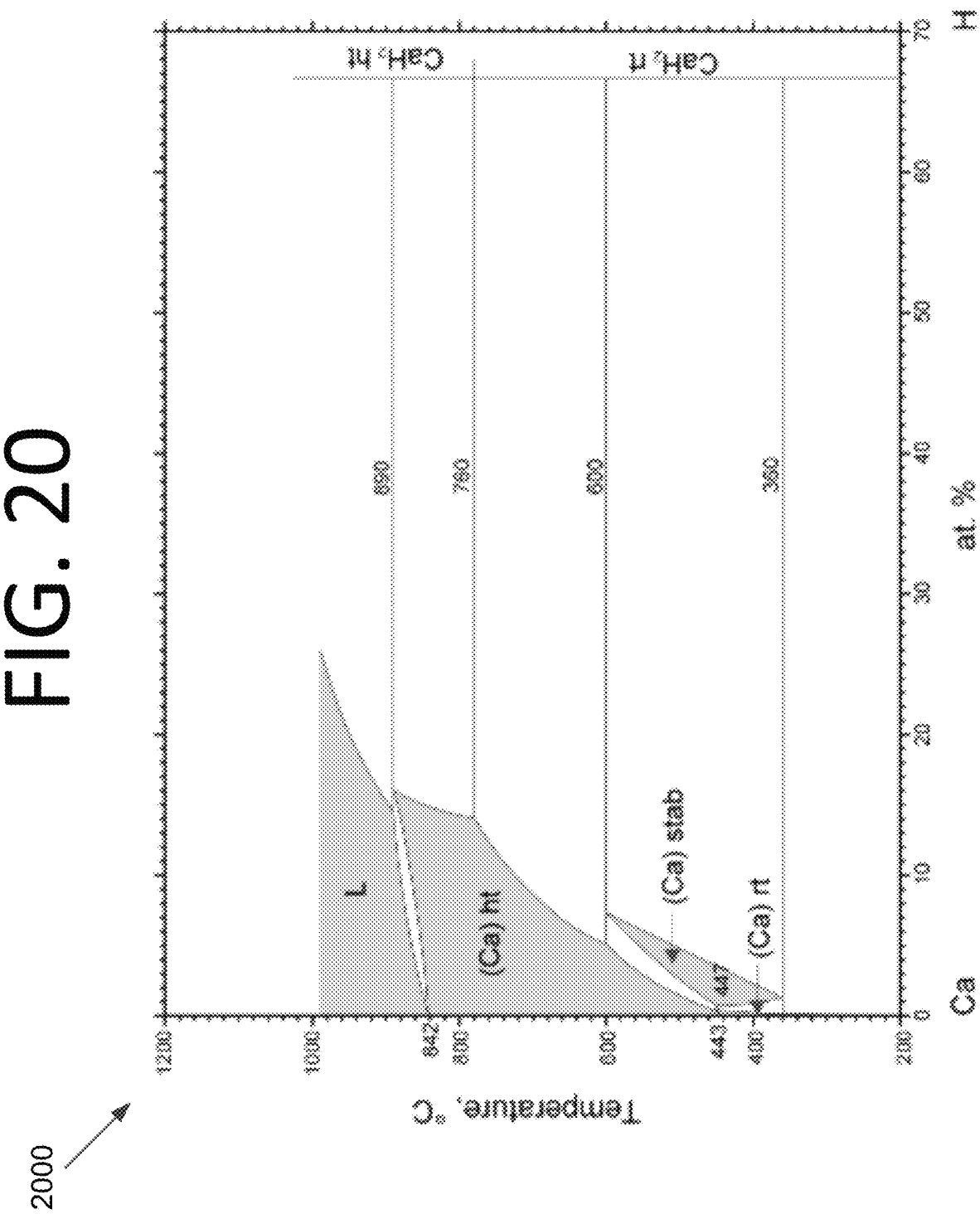
FIG. 20 is a partial temperature-composition phase diagram for the Ca—H system.

A unique feature of $CeH_2$ is the fact that it is able to retain hydrogen to very high temperatures relative to the melting point of Ce metal. Thermogravimetry studies at the Fuels Research Lab of $CeH_2$ in inert (Ar) and hydrogen-containing (6% $H_2$/Ar) conditions are shown in thermogram 1500 of FIG. 15. As can be seen in FIG. 15, under inert conditions, $CeH_2$ exhibits some mass gain, which could be due to slight oxidation. However, the principal mass change is due to hydrogen desorption, which starts at ~680° C., but does not complete until ~930° C. In a 6% $H_2$/Ar, hydrogen desorption does not start until ~800° C. and reaches completion at ~1000° C. The melting point of Ce metal is 795° C., indicating that Ce is able to retain hydrogen to very high temperatures relative to its melting point and to temperatures similar that of yttrium. Similar plots for hydrogen desorption from $YH_2$ as a function of temperature are shown in thermogram 1600 of FIG. 16. Under inert conditions, $YH_2$ begins to dehydride at ~760° C. and fully dehydrides at ~1095° C., while in 6% $H_2$/Ar, it begins to dihydride at ~830° C. and fully dehydrides at ~1095° C.

One aspect that should also be considered is secondary phase formation for the hydrides. This was identified as an issue for the Y—H system, as recent work identified the deleterious effect of $YH_3$. For $YH_3$ compositions greater than ~10 vol %, it was found that powder-processed $YH_2$ was not able to hold together and rapidly pulverized. To that end, partial temperature-composition phase diagrams 1700, 1800, 1900, 2000 of FIGS. 17, 18, 19, and 20 show the phase diagrams of the Y—H, Ce—H, Gd—H, and Ca—H systems, respectively.

Figure 21:
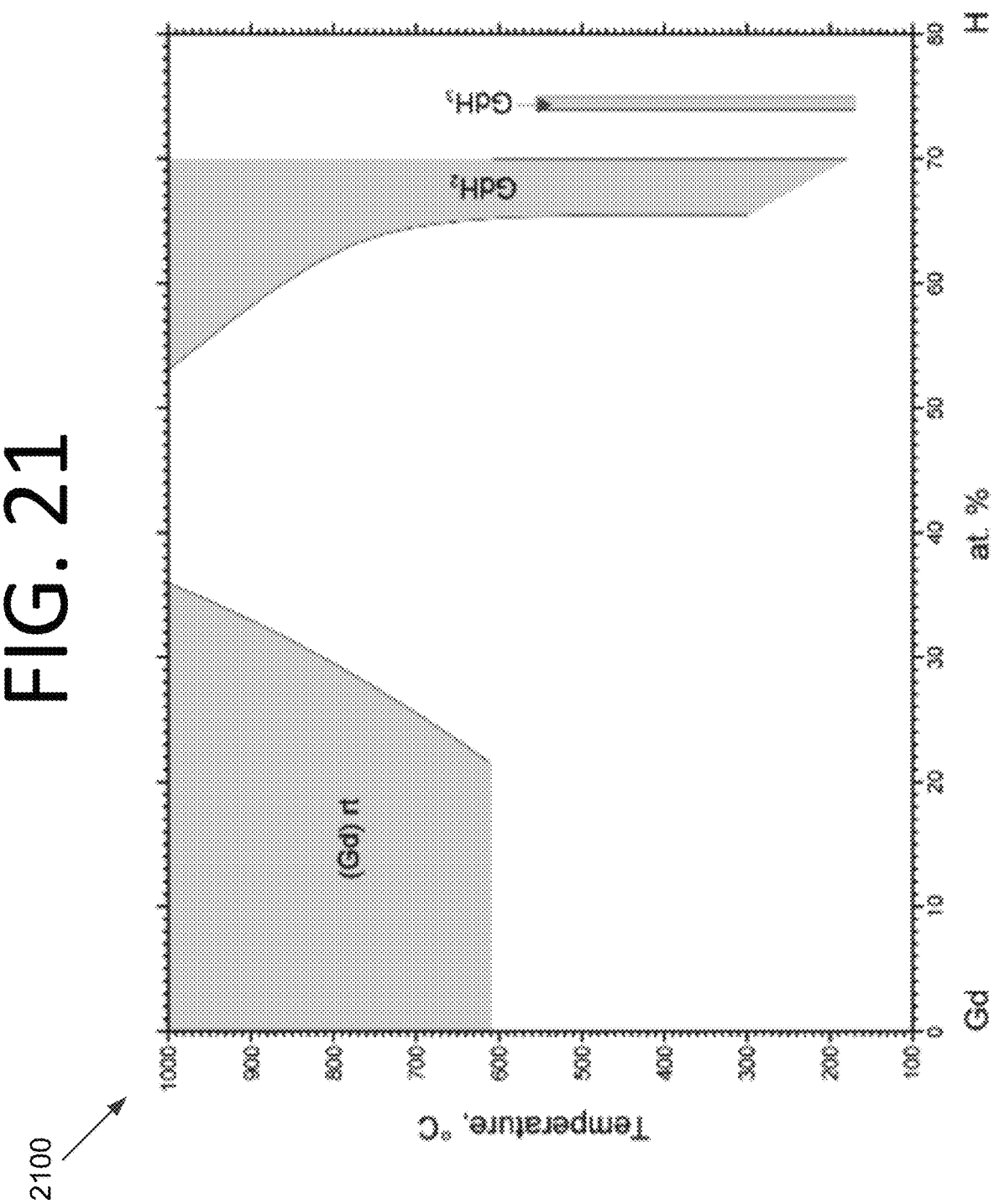
FIG. 21 is a graph illustrating a partial temperature-composition phase diagram for the Gd—H system with a high H-content presence of a trihydride phase.

Multiple YHx phases have a negative effect on the structural integrity of hydride monoliths. Partial temperature-composition phase diagram 2100 of FIG. 21 shows that CeHx maintains H/Ce>2 for temperatures greater than 100° C. A trihydride phase also exists in the Gd—H system, but it has been found to be stable only for temperatures lower than 600° C., similar to that of $YH_3$.

Composites and Alloys

Figure 22:
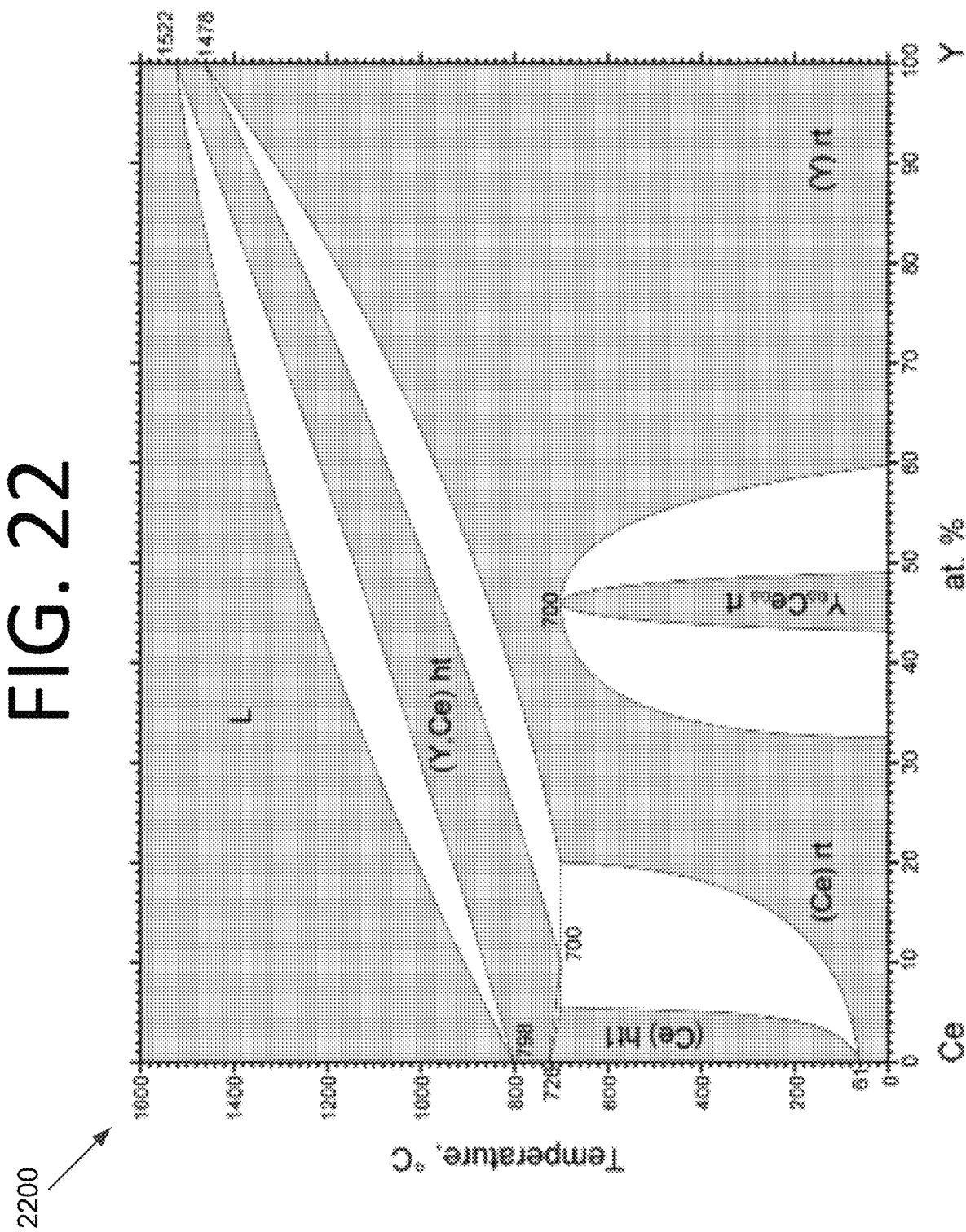
FIG. 22 is a partial temperature-composition phase diagram for the Ce—Y system.

One significant reason why Y—Gd and Y—Ce alloys may be beneficial in some embodiments is the large solubility range that Gd and Ce have with Y. See partial temperature-composition phase diagrams 2200, 2300, 2400 of FIGS. 22, 23, and 24, which show the Y—Ce, Y—Gd, and Y—Ca phase diagrams, respectively. FIG. 22 shows a large solubility range between Ce and Y, with a spinodal decomposition ($Ce_{0.5}Y_{0.5}$) at low temperatures and Ce contents between 40 and 70%. Based on FIG. 22, it should be possible to reliably synthesize Y—Ce alloys with Ce contents up to 40% to maintain high-temperature stability, though the composition may be tuned based on operating conditions. There does appear to be a phase transformation that occurs in this system at high temperature, and its effect on hydride stability is not known.

Figure 23:
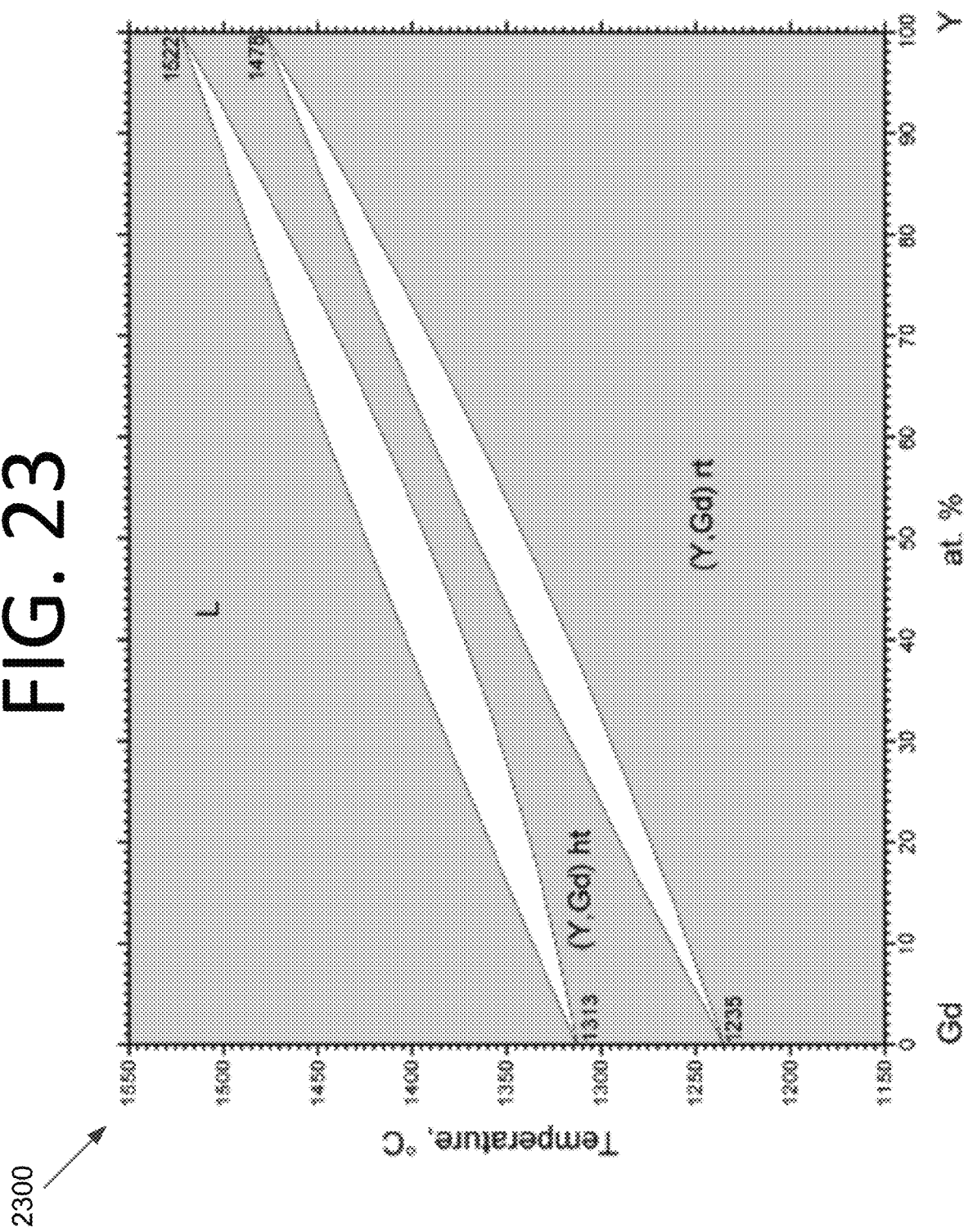
FIG. 23 is a partial temperature-composition phase diagram for the Gd—Y system.

Similarly, FIG. 23 shows the temperature-composition phase diagram 2300 for the Gd—Y system. There are no low-temperature secondary phases. From this, it can be inferred that Y and Gd have perfect solubility with one another for the whole composition range such that any Y—Gd alloy could be fabricated and remain stable in the temperature ranges of interest for nuclear reactor applications.

Figure 24:
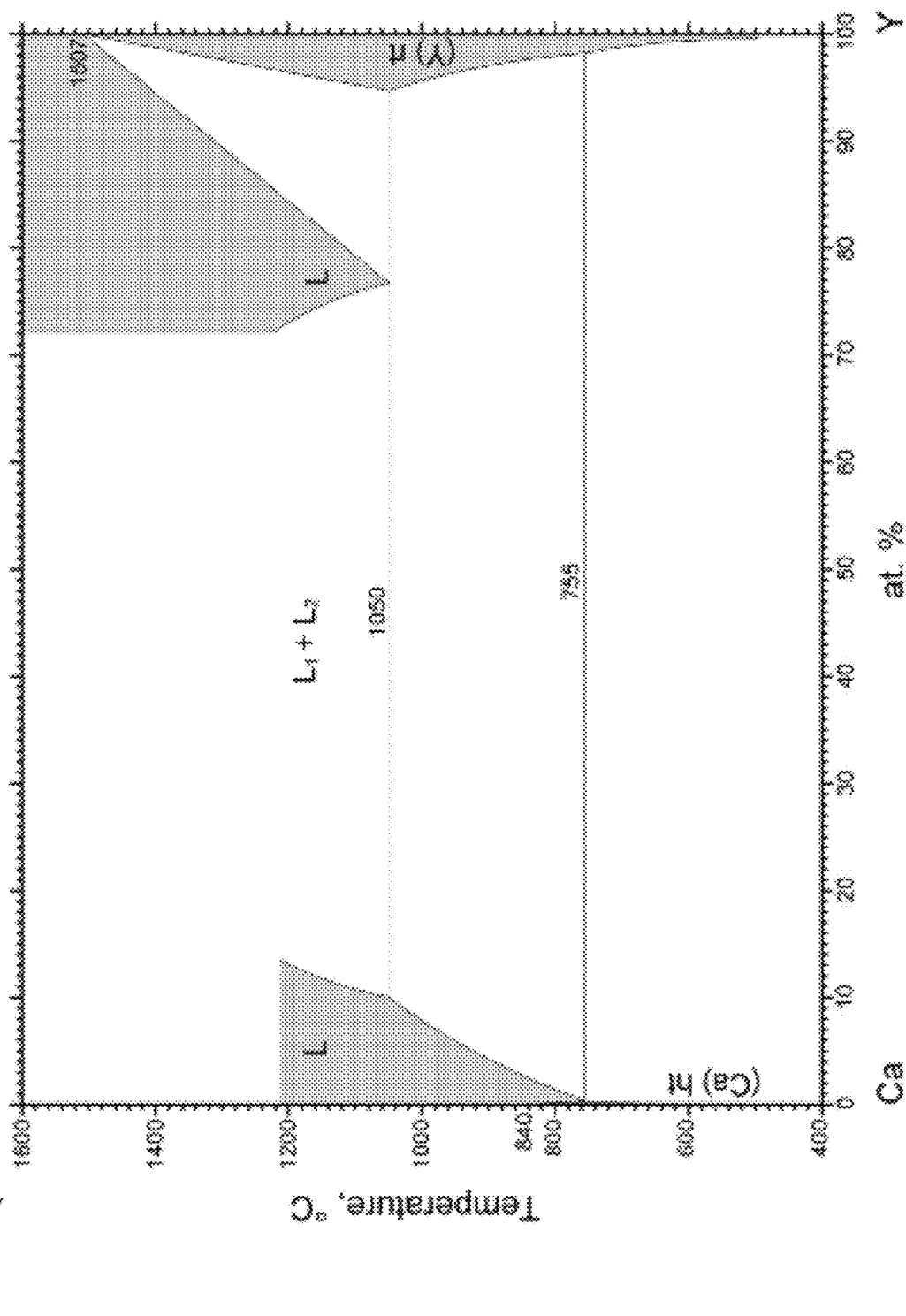
FIG. 24 is a partial temperature-composition phase diagram for the Ca—Y system.

FIG. 24 shows the temperature-composition phase diagram 2400 for the Ca—Y system. Phase diagram 2400 shows little solubility between Ca and Y at low temperatures, indicating that alloys of these elements will be phase-separated materials. This will likely be the same for Y—Ca alloy hydrides as well.

Figure 25:
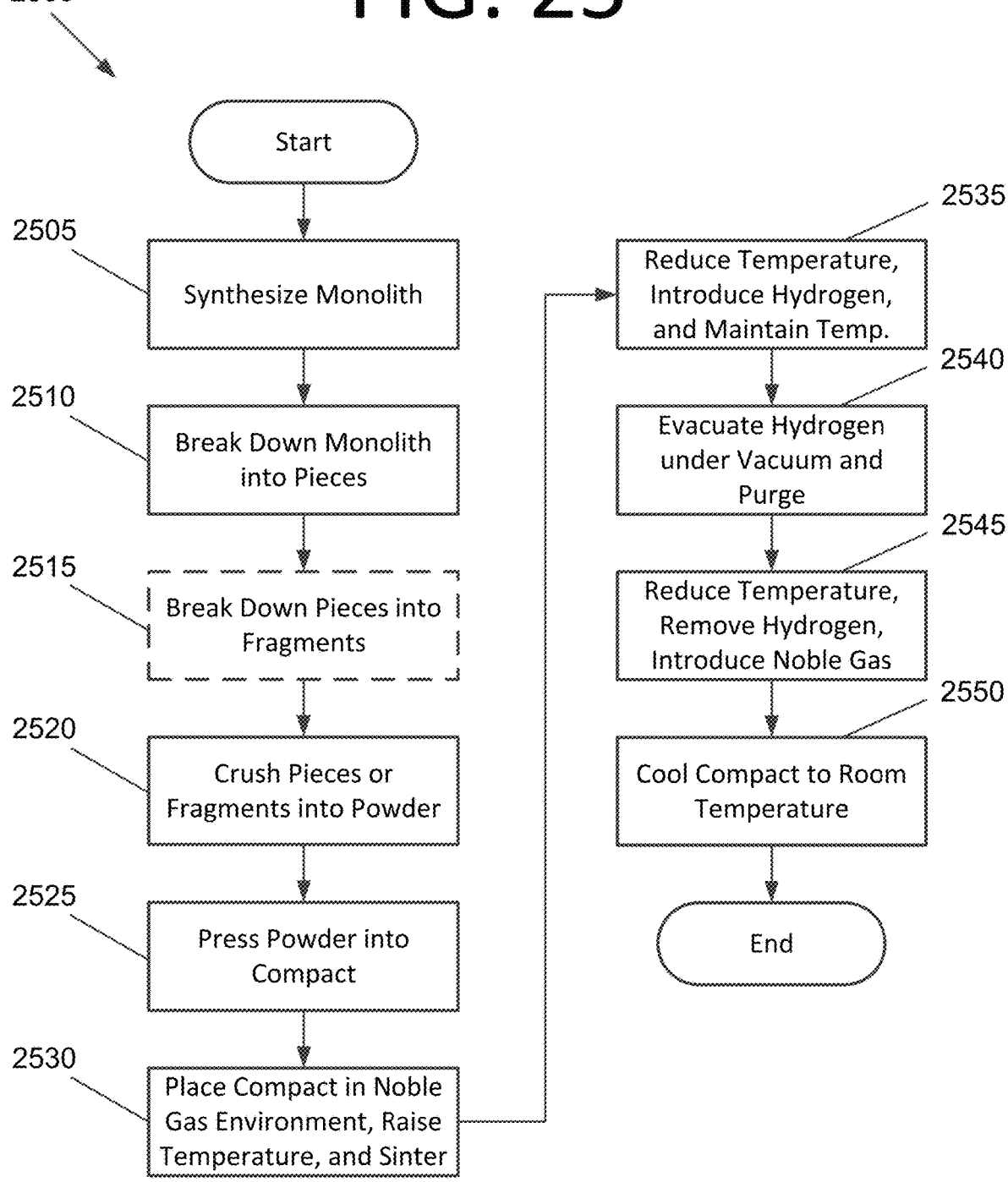
FIG. 25 is a flowchart illustrating a process for creating a moderator, according to an embodiment of the present invention.

FIG. 25 is a flowchart illustrating a process 2500 for creating a moderator, according to an embodiment of the present invention. The process begins with synthesizing one or more metal hydrides, one or more metal hydride alloys, or a combination thereof, into a monolith at 2505. The monolith is broken down into pieces at 2510. The pieces may be further broken down into fragments (e.g., using a glovebox line that includes a noble gas) at 2515. In some embodiments, the generated fragments have a weight of 1 gram or less. The pieces or fragments are crushed into a powder at 2520, and at least a portion of the powder is pressed into a compact at 2525. In certain embodiments, an additive may be included with the fragments.

The compact is placed into a furnace including a noble gas, the temperature in the furnace is raised to a maximum temperature (e.g., a first temperature), and the maximum temperature is maintained for a period of time at 2530, thus dehydriding and sintering the compact. In some embodiments the maximum temperature is 1200° C. The maximum temperature in the furnace is reduced to a second, lower temperature, hydrogen for hydriding is introduced to the furnace, and the second lower temperature is maintained for a period of time until a target stoichiometry of the material of the compact is reached at 2535. In some embodiments, the hydrogen is introduced via 6% $H_2$/Ar gas.

The hydrogen and the noble gas are evacuated under vacuum for a period of time and then a noble gas purge is performed at 2540. The temperature in the furnace is reduced to a third temperature that is lower than the second temperature, the hydrogen is removed, and a noble gas is introduced at 2545. The compact is then cooled to room temperature at 2550, producing the finished moderator.

In some embodiments, the one or more metal hydrides, the one or more metal hydride alloys, or the combination thereof include one or more hydrides of yttrium (Y), thorium (Th), cerium (Ce), calcium (Ca), zirconium (Zr), scandium (Sc), beryllium (Be), lithium (Li), a yttrium-cerium alloy, a yttrium-gadolinium alloy, a yttrium-calcium alloy, or any combination thereof. In certain embodiments. one or more yttrium-cerium alloys, one or more yttrium-gadolinium alloys, or a combination thereof, are used to form the monolith, and the cerium, the gadolinium, or both, are in solution with yttrium metal. In some embodiments, liquid calcium hydride, cerium hydride, or a combination thereof, are used to form the monolith.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

In an embodiment, a method includes synthesizing one or more bulk metal hydrides into at least one monolith, forming at least one monolith of the one or more metal hydrides. In some embodiments, the metal hydride includes one or more hydrides of yttrium hydride, thorium hydride, or any other suitable hydride without deviating from the scope of the invention. For instance, hydrides of yttrium (Y), thorium (Th), cerium (Ce), calcium (Ca), zirconium (Zr), scandium (Sc), beryllium (Be), lithium (Li), or any combination thereof. In certain embodiments, the synthesis of the one or more bulk metal hydrides is performed in a Sievert's apparatus that includes a gas manifold with a series of tubes and valves connecting a sample chamber to one or more pressure reservoirs of known volume.

The method also includes breaking down the at least one monolith into pieces. In some embodiments, the pieces are further broken down using a glovebox line, for example, that includes a noble gas. In certain embodiments, the fragments generated in the glovebox line may be 1 g or less. In some embodiments, a binder is added to the pieces. In certain embodiments, the binder includes an EBS binder.

The method further includes crushing the pieces (or fragments) into a powder. In some embodiments, method includes sieving the powder to separate out larger particles. Additionally, the method includes pressing the powder into a shape to form a green body and sintering the green body using a controlled hydrogen stoichiometry. In some embodiments, the powder is pressed using a punch and die set. In certain embodiments, the sintering occurs for approximately ten hours. In some embodiments, the hydrogen stoichiometry is altered by stopping a flow of hydrogen at a predetermined temperature.

In some embodiments, the method includes placing the one or more moderators in a clad. In certain embodiments, the clad is a molybdenum clad. In some embodiments, the one or more moderators are held in place via retaining pins. In certain embodiments, multiple layers of moderators are stacked on top of one another. In some embodiments, the method includes sealing the clad by welding a lid onto the clad.

In another embodiment, a method for producing a moderator includes crushing down at least one metal hydride monolith into a powder. The method also includes pressing the powder into a shape to form a green body and sintering the green body using a controlled hydrogen stoichiometry.

In yet another embodiment, a method for producing a moderator includes making at least one monolith of one or more high purity metal hydrides. The method also includes crushing the at least one monolith into a powder and pressing the powder into a compact. The method further includes placing the compact into a noble gas environment, raising the temperature, and sintering the compact. Additionally, the method includes reducing the temperature to a first lower temperature and introducing hydrogen, which rehydrides material of the compact. The method also includes further reducing the temperature to a second lower temperature that is lower than the first lower temperature, removing the hydrogen, and introducing a noble gas. The method further includes cooling the compact to room temperature, producing a moderator.

In an embodiment, a method for producing moderators includes conducting an argon environment dehydriding and sintering phase in a furnace. During this phase, a compact of hydride metal or a hydride metal alloy is heated to a desired maximum temperature, maintained at the maximum temperature for a period of time, and then the temperature is lowered to a first lower temperature for hydriding. The method also includes performing hydriding in an $H_2$/Ar environment after reaching the lowered temperature. This involves bringing the amount of hydrogen to a desired level, maintaining this temperature for a period of time until the desired stoichiometry is reached, and then lowering the temperature to a second lower temperature than the $H_2$/Ar temperature. After reaching this lower temperature, the method further includes evacuating the $H_2$/Ar under vacuum for a period of time and then performing an argon purge. Additionally, the method includes leaving the compact in the second lower temperature environment for a period of time and the cooling the furnace to room temperature.

In some embodiments, the moderators are metal and metal alloy hydride moderators. For instance, the moderators may include yttrium, thorium, and/or alloys thereof. For instance, metal alloys may include, but are not limited to, yttrium-cerium alloys, yttrium-gadolinium alloys, etc. In certain embodiments, the cerium and/or gadolinium may be in solution with the yttrium metal. While a metal or metal alloy is used in some embodiments, in certain embodiments, liquid calcium hydride is used. In certain embodiments, cerium hydride is used.

In some embodiments, the maximum temperature is approximately 1200° C. In certain embodiments, a gas flow rate of approximately 200 standard SCCM is used. In some embodiments, the $H_2$/Ar gas is approximately 6% $H_2$/Ar. In certain embodiments, the furnace gas pressure is approximately one atmosphere.

In another embodiment, a method for producing metal or metal alloy hydride moderators includes conducting an argon environment dehydriding and sintering phase in a furnace. During this phase, a compact of hydride metal or a hydride metal alloy is heated to a desired maximum temperature, maintained at the maximum temperature for a period of time, and then the temperature is lowered to a first lower temperature for hydriding. The method also includes performing hydriding in an $H_2$/Ar environment after reaching the lowered temperature. This involves bringing the amount of hydrogen to a desired level, maintaining this temperature for a period of time until the desired stoichiometry is reached, and then lowering the temperature to a second lower temperature than the $H_2$/Ar temperature. After reaching this lower temperature, the method further includes evacuating the $H_2$/Ar under vacuum for a period of time and then performing an argon purge. Additionally, the method includes leaving the compact in the second lower temperature environment for a period of time and the cooling the furnace to room temperature.

In yet another embodiment, a method for producing cerium hydride, yttrium-calcium alloy, yttrium-cerium alloy, and/or yttrium-gadolinium alloy hydride moderators includes conducting an argon environment dehydriding and sintering phase in a furnace. During this phase, a compact of hydride alloy is heated to a desired maximum temperature, maintained at the maximum temperature for a period of time, and then the temperature is lowered to a first lower temperature for hydriding. The method also includes performing hydriding in an $H_2$/Ar environment after reaching the lowered temperature. This involves bringing the amount of hydrogen to a desired level, maintaining this temperature for a period of time until the desired stoichiometry is reached, and then lowering the temperature to a second lower temperature than the $H_2$/Ar temperature. After reaching this lower temperature, the method further includes evacuating the $H_2$/Ar under vacuum for a period of time and then performing an argon purge. Additionally, the method includes leaving the compact in the second lower temperature environment for a period of time and the cooling the furnace to room temperature.

The invention claimed is:

1. A method for producing a moderator, comprising:
   placing a compact comprising at least one of a metal hydride, a metal alloy hydride, or a combination thereof, into a furnace comprising a noble gas;
   raising a temperature in the furnace to a first temperature above about 1000° C., and maintaining the first temperature for a period of time, thereby sintering the compact;
   reducing the first temperature in the furnace to a second temperature lower than the first temperature;
   introducing a first gas comprising at least about 4% hydrogen into the furnace;
   maintaining the second temperature for a period of time until a target stoichiometry of a hydride material in the compact is reached;
   reducing the second temperature in the furnace to a third temperature that is lower than the second temperature;
   evacuating the first gas under vacuum for a period of time and then performing a noble gas purge; and
   cooling the compact, thereby producing a moderator, wherein
   the moderator has a density that is greater than about 85% of the theoretical density of the hydride material.

2. The method of claim 1, wherein the density of the moderator is greater than about 90% of the theoretical density of the hydride material.

3. The method of claim 2, wherein the density of the moderator is greater than about 95% of the theoretical density of the hydride material.

4. The method of claim 1, wherein the first temperature is above about 1100° C.

5. The method of claim 1, wherein the first temperature is above about 1200° C.

6. The method of claim 1, wherein the at least one of the metal hydride, the metal alloy hydride, or the combination thereof comprises at least one of yttrium hydride, a yttrium alloy hydride, or a combination thereof.

7. The method of claim 1, wherein the at least one of the metal hydride, the metal alloy hydride, or the combination thereof comprises at least one of zirconium hydride, a zirconium alloy hydride, or a combination thereof.

8. The method of claim 1, wherein the at least one of the metal hydride, the metal alloy hydride, or the combination thereof comprises a yttrium-cerium hydride.

9. The method of claim 1, wherein the at least one of the metal hydride, the metal alloy hydride, or the combination thereof comprises a yttrium-gadolinium hydride.

10. The method of claim 1, wherein the at least one of the metal hydride, the metal alloy hydride, or the combination thereof comprises at least one of a metal hydride or a metal alloy hydride of thorium, cerium (Ce), calcium (Ca), scandium (Sc), beryllium (Be), lithium (Li), a yttrium-calcium alloy, or any combination thereof.

11. A method for producing a moderator, comprising:
synthesizing at least one of a metal hydride, metal alloy hydride, or a combination thereof, into at least one monolith;
breaking down the at least one monolith into pieces;
crushing the pieces into a powder;
pressing the powder into the compact;
placing the compact into a furnace comprising a noble gas;
raising a temperature in the furnace to a first temperature above about 1000° C., and maintaining the first temperature for a period of time, thereby sintering the compact;
reducing the first temperature in the furnace to a second temperature lower than the first temperature;
introducing a first gas comprising at least about 4% hydrogen into the furnace;
maintaining the second temperature for a period of time until a target stoichiometry of a hydride material in the compact is reached;
reducing the second temperature in the furnace to a third temperature that is lower than the second temperature;
evacuating the first gas under vacuum for a period of time and then performing a noble gas purge; and
cooling the compact, thereby producing a moderator, wherein
the moderator has a density that is greater than about 85% of the theoretical density of the hydride material.

12. A method for producing a moderator, comprising:
placing a compact comprising at least one of yttrium hydride, a yttrium alloy hydride, zirconium hydride, a zirconium alloy hydride, or a combination thereof, into a furnace comprising a noble gas;
raising a temperature in the furnace to a first temperature above about 1000° C., and maintaining the first temperature for a period of time, thereby sintering the compact;
reducing the first temperature in the furnace to a second temperature lower than the first temperature;
introducing a first gas comprising at least about 4% hydrogen into the furnace;
maintaining the second temperature for a period of time until a target stoichiometry of a hydride material in the compact is reached;
reducing the second temperature in the furnace to a third temperature that is lower than the second temperature;
evacuating the first gas under vacuum for a period of time and then performing a noble gas purge; and
cooling the compact, thereby producing a moderator, wherein
the moderator has a density that is greater than about 85% of the theoretical density of the hydride material.

13. The method of claim 12, wherein the density of the moderator is greater than about 90% of the theoretical density of the hydride material.

14. The method of claim 12, wherein the density of the moderator is greater than about 95% of the theoretical density of the hydride material.

15. The method of claim 12, wherein the first temperature is above about 1100° C.

* * * * *